US009616570B2

(12) United States Patent
Nihei et al.

(10) Patent No.: US 9,616,570 B2
(45) Date of Patent: Apr. 11, 2017

(54) DEVICE AND METHOD FOR CONTROLLING ROBOT

(75) Inventors: Ryo Nihei, Fujiyoshida (JP); Tetsuaki Kato, Hadano (JP); Hiroji Nishi, Yamanashi (JP)

(73) Assignee: FANUC LTD, Minamitsuru-gun, Yamanashi (JP)

( * ) Notice: Subject to any disclaimer, the term of this patent is extended or adjusted under 35 U.S.C. 154(b) by 2543 days.

(21) Appl. No.: 11/447,034

(22) Filed: Jun. 6, 2006

(65) Prior Publication Data

US 2006/0276934 A1    Dec. 7, 2006

(30) Foreign Application Priority Data

Jun. 7, 2005   (JP) .................................. 2005-166893

(51) Int. Cl.
*G06F 19/00* (2011.01)
*B25J 9/16* (2006.01)

(52) U.S. Cl.
CPC ........... *B25J 9/1679* (2013.01); *B25J 9/1656* (2013.01); *G05B 2219/40584* (2013.01)

(58) Field of Classification Search
USPC ................................................ 700/249, 264
See application file for complete search history.

(56) References Cited

U.S. PATENT DOCUMENTS 4,484,120 A * 11/1984 Olex et al. ................ 318/568.14
4,534,006 A *  8/1985 Minucciani et al. ......... 700/249
(Continued)

FOREIGN PATENT DOCUMENTS

EP     1 426 842      6/2004
JP     2000-31241     1/2000
(Continued)

OTHER PUBLICATIONS

Japanese Notice of Reasons for Rejection mailed Dec. 11, 2007 issued in Japanese Application No. 2005-166893.
(Continued)

*Primary Examiner* — Mussa A Shaawat
*Assistant Examiner* — Kyung Kim
(74) *Attorney, Agent, or Firm* — Drinker Biddle & Reath LLP

(57) ABSTRACT

A robot controller making a robot execute tasks including several work units in a parallel manner for several workpieces, in accordance with several operation programs for individually commanding the work units. The robot controller includes an information collecting section collecting state information showing, in real time, a state of an environment of the robot; a program selecting section selecting a first executable program satisfying a task starting condition, from operation programs ready to be executed for workpieces, based on the state information; a processing section processing, for execution, the first executable program; and a program-completion judging section judging whether the processing section has completed a processing of the first executable program. The program selecting section selects, based on the state information, a second executable program satisfying the task starting condition, from the operation programs ready to be executed, so as to satisfy a judgment of the program-completion judging section.

11 Claims, 25 Drawing Sheets

(56) References Cited

U.S. PATENT DOCUMENTS

| | | | |
|---|---|---|---|
| 4,543,639 A * | 9/1985 | Inaba et al. | 700/249 |
| 4,633,385 A * | 12/1986 | Murata et al. | 700/86 |
| 5,266,878 A * | 11/1993 | Makino et al. | 318/571 |
| 5,548,193 A * | 8/1996 | Lee et al. | 318/568.11 |
| 5,579,444 A * | 11/1996 | Dalziel et al. | 700/259 |
| 5,742,824 A * | 4/1998 | Kosaka | 718/106 |
| 5,834,916 A * | 11/1998 | Shimogama et al. | 318/568.13 |
| 6,039,168 A * | 3/2000 | Head, III | 198/341.07 |
| 6,163,124 A * | 12/2000 | Ito et al. | 318/567 |
| 6,895,284 B2 * | 5/2005 | Morita | 700/19 |
| 6,944,584 B1 * | 9/2005 | Tenney et al. | 703/22 |
| 6,975,913 B2 * | 12/2005 | Kreidler et al. | 700/96 |
| 2002/0105296 A1 * | 8/2002 | Okuyama et al. | 318/568.16 |
| 2003/0014387 A1 * | 1/2003 | Kreidler et al. | 707/1 |
| 2004/0133312 A1 * | 7/2004 | Watanabe et al. | 700/264 |

FOREIGN PATENT DOCUMENTS

| | | |
|---|---|---|
| JP | 2004-181564 | 7/2004 |
| JP | 2004-185228 | 7/2004 |

OTHER PUBLICATIONS

Japanese Notice of Reasons for Rejection mailed Jul. 8, 2008 issued in Japanese Application No. 2005-166893 (including a partial translation thereof).

European Search Report mailed Dec. 4, 2009 issued in European Application No. 06011656.3.

Soetens et al., Realtime Hybrid Task-Based Control for Robots and Machine Tools, Robotics and Automation, 2005, Proceedings of the 2005 IEEE International Conference on Barcelona, Spain, Apr. 18-22, 2005, pp. 259-264.

* cited by examiner

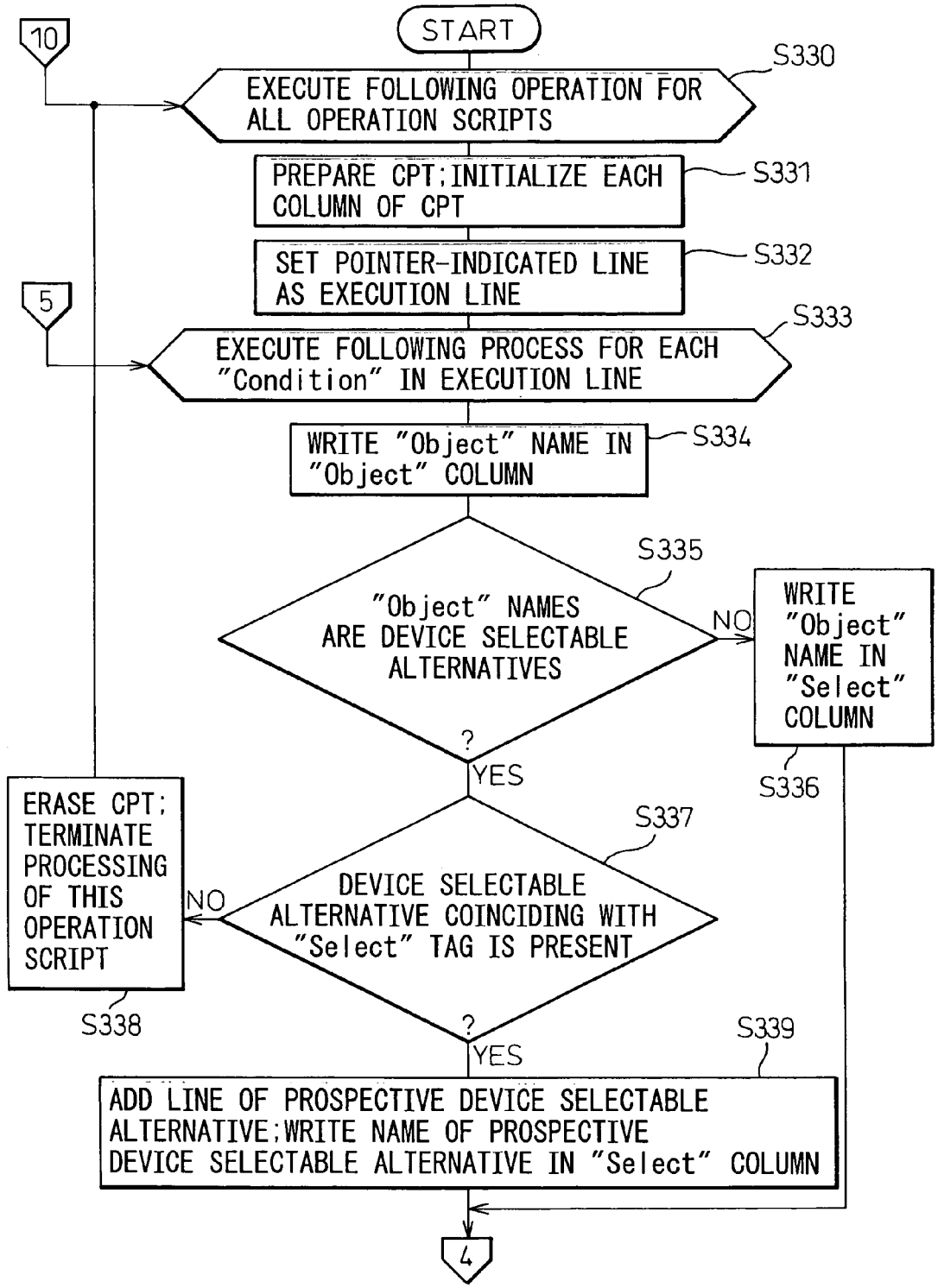

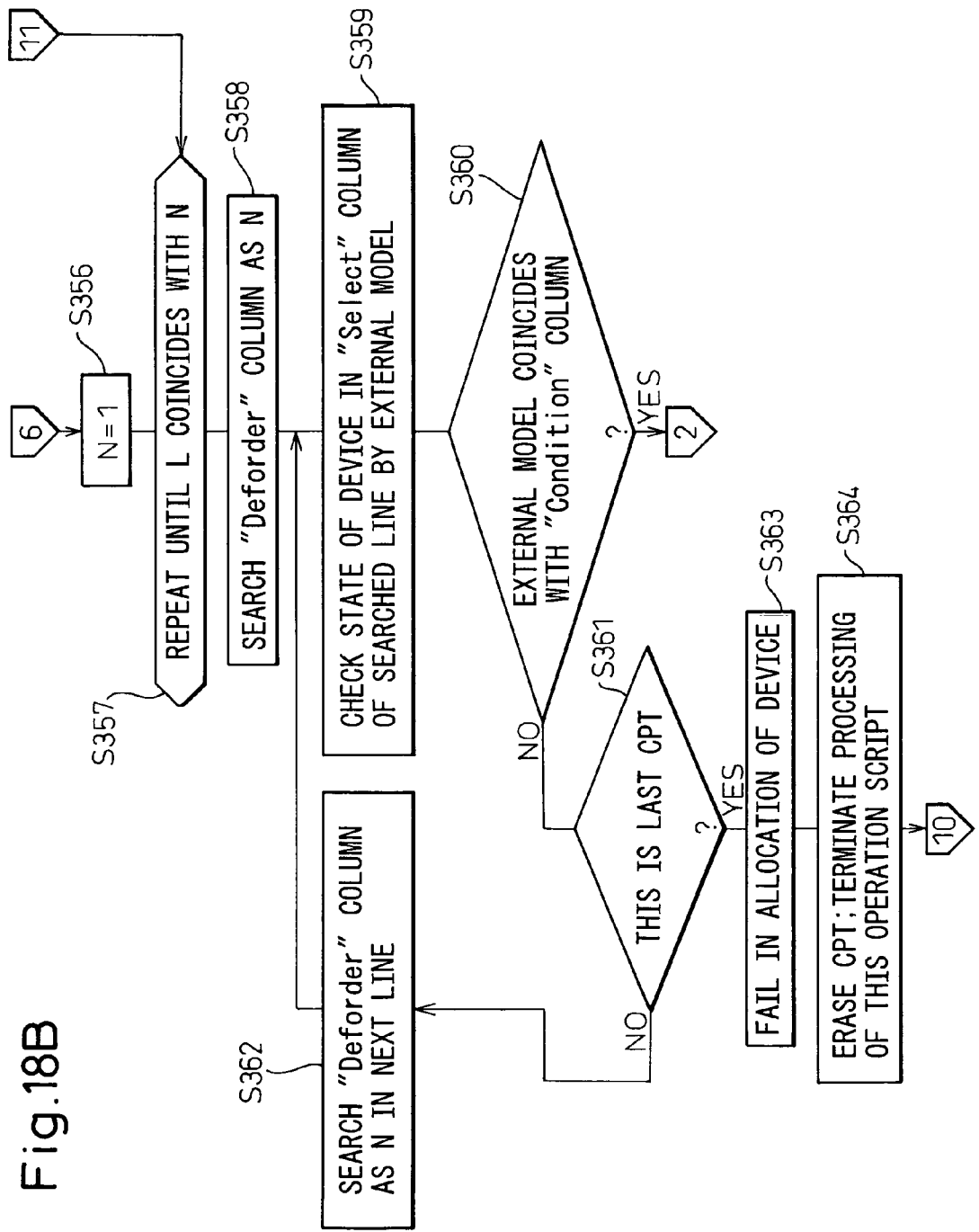

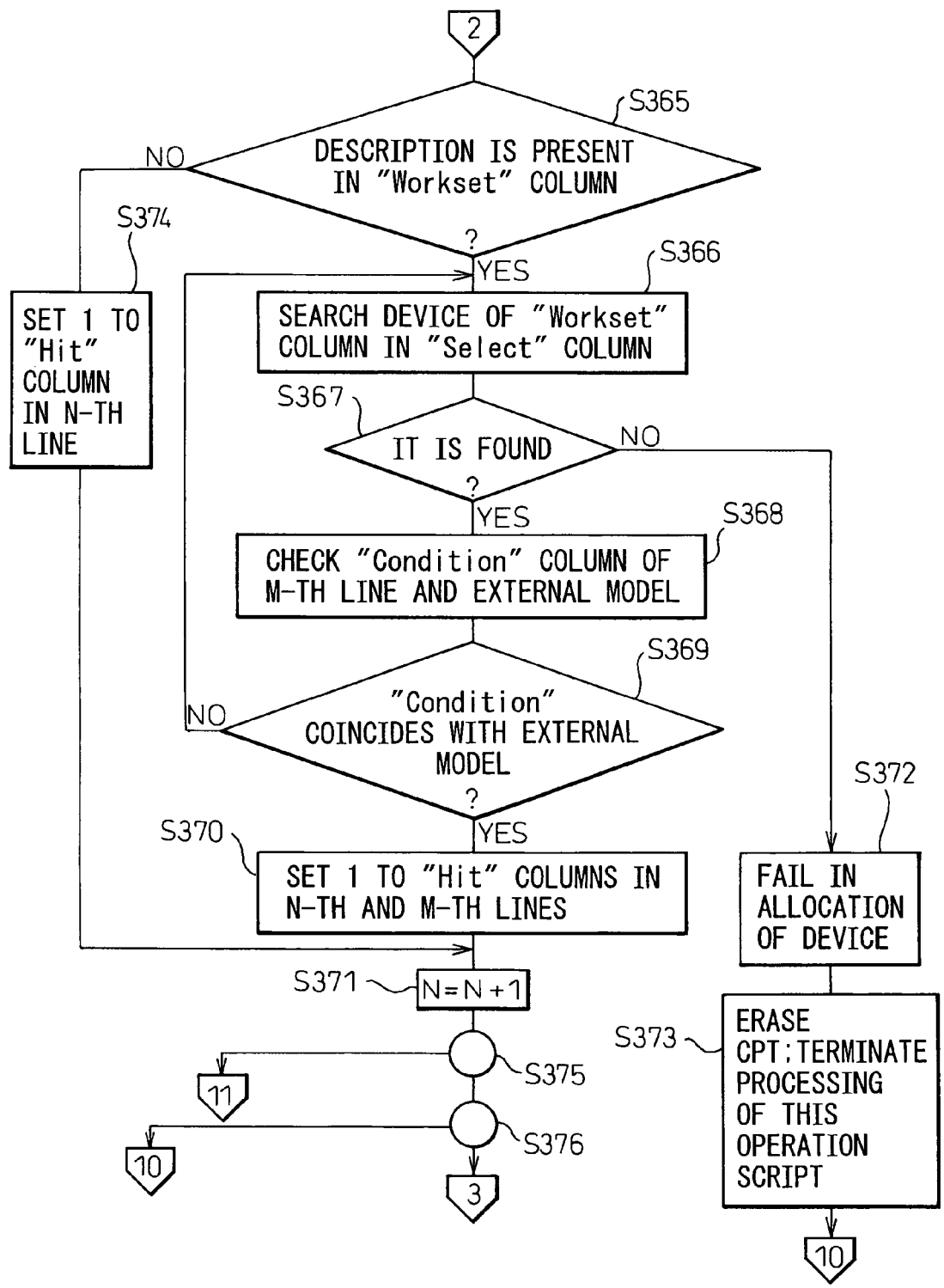

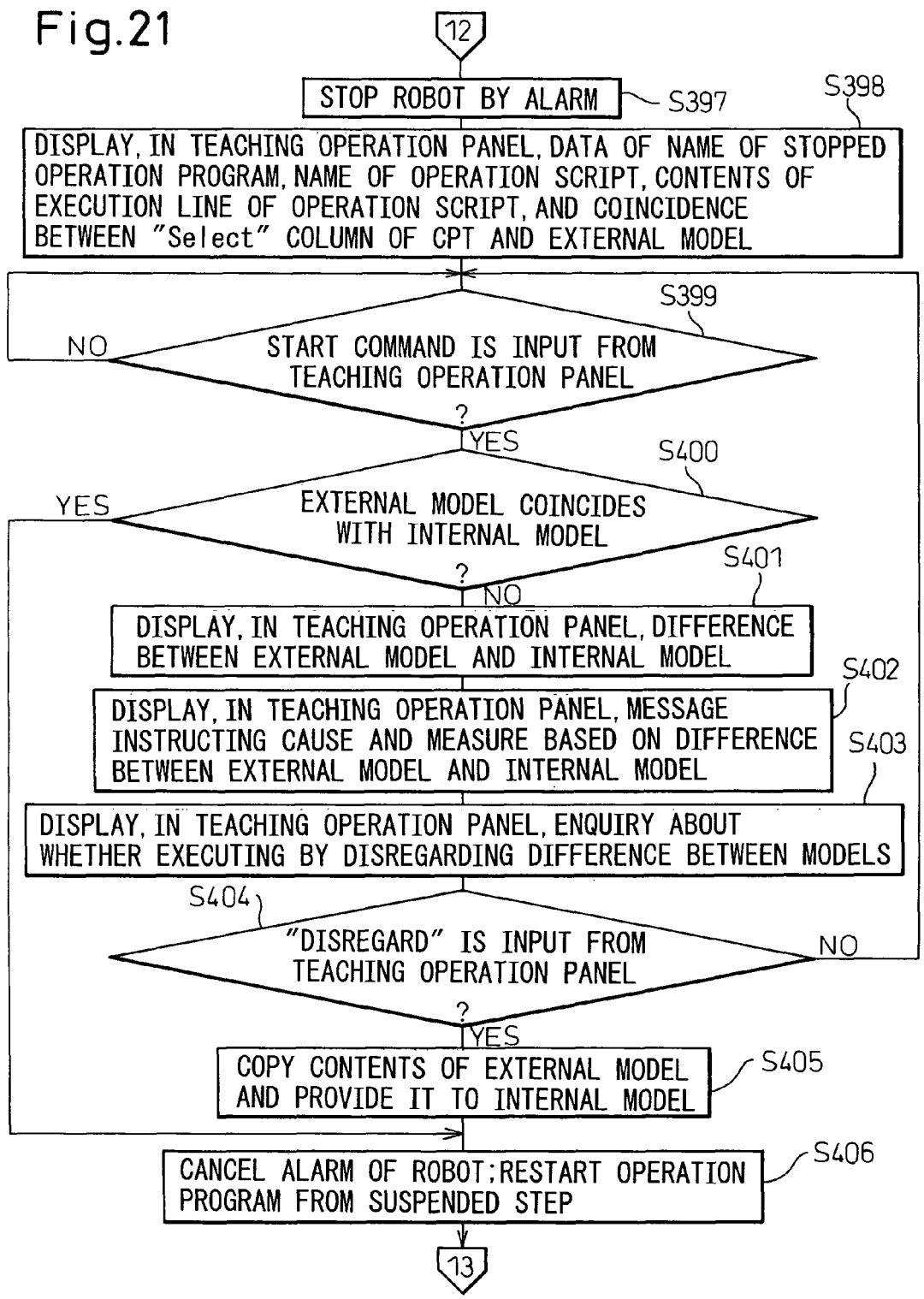

Fig.22

| Object | Select | Deforder | Condition | Workset | Hit | Result |
|---|---|---|---|---|---|---|
| machines | machine#1 | 1 | Ready To Process | table#1 | 1 | – |
| machines | machine#2 | 1 | Ready To Process | table#2 | 0 | – |
| tables | table#1 | 2 | Have on table | – | 1 | Empty on table |
| tables | table#2 | 2 | Have on table | – | 0 | Empty on table |
| robot | robot | 3 | Empty handed | – | 1 | Grasping in hand |
| | | | | | | |
| | | | | | | |
| | | | | | | |
| | | | | | | |
| | | | | | | |
| | | | | | | |

104

DEVICE AND METHOD FOR CONTROLLING ROBOT

BACKGROUND OF THE INVENTION

1. Field of the Invention

The present invention relates to a device for controlling a robot. The present invention also relates to a method for controlling a robot.

2. Description of the Related Art

An industrial robot (hereinafter referred to simply as a robot) operates so as to follow a certain operation program (or a task program). When several kinds of operation programs are prepared, which correspond to the types of tools (or end effecters) attached to the robot, the types of objective workpieces, the contents of tasks, etc., and are suitably and selectively given to a robot, the robot as a single machine can execute various kinds of tasks. In order to prepare an operation program to control the operation of a robot, an operator makes the respective control axes of the robot run in a manual mode at low speed, generally by using an operating panel or "a teach pendant", so as to sequentially position a tool at a plurality of working points at which a task is performed on a workpiece, and thereby makes the robot store the working points as "taught points". The robot stores the actual positions of the respective control axes at an instant the tool is positioned at each of the working points, as the information of position and orientation of the robot at each of the taught points. In this connection, it is also known to perform the above programming by teaching, through an offline simulation using a personal computer or the like.

The robot can repeatedly perform the identical task to follow the taught operation program. If it is required to change the contents of the task, a new operation program matching the new task contents must be prepared. For example, in a case where an item to be produced is added or changed in a highly automated manufacturing system using a robot, a production line is required to be modified. In this connection, a large number of actions are required to redesign various kinds of hardware, such as a jig, a machine, a conveyor, etc., and to prepare or remake various kinds of software, such as a processing program of a processing machine, an operation program of a robot, a sequence ladder and a production management program of a programmable controller (PC) or a production management device, etc. Effectively reducing the number of actions required to construct the hardware/software, so as to deal with a modification of the production line, has been recognized as a significant problem relating to costs in the automated manufacturing system, and therefore it is desirable to decrease the number of steps for preparing an operation program of a robot.

As a measure for facilitating the preparation and/or change of the operation program of a robot, it has been known that a single cycle task, performed by a robot for a single workpiece, is divided into a plurality of mutually different units of works (or work units), and a plurality of operation programs commanding the respective work units are prepared and then given to the robot in a suitably combined form. For example, Japanese Unexamined Patent Publication (Kokai) No. 2004-185228 (JP-A-2004-185228) discloses a configuration in which, in a manufacturing cell including a robot and a processing machine, a series of tasks performed by the robot and processing machine are divided into several work units, and an information processing device gives several operation programs, for commanding the respective work units, to the robot or the processing machine in a suitable order. When it is desired to add or change a produced item, it is sufficient to review or remake an operation program in relation only to a work unit required to be added or changed in company with the addition or change of the produced item, which can reduce the cost for preparing or remaking the robot operation program in company with the change in the production line.

In this connection, the term "a work unit" in the present application means a task that can be specified or distinguished on the basis of a single action, such as holding a workpiece, placing a workpiece, watching a workpiece, and so on. Usually, it is not reasonable, during a period when one work unit is performed, to insert a different work unit therein. Upon combining several identical or different work units with each other in various ways, various kinds of tasks can be realized.

In a manufacturing system for manufacturing a plurality of products in a parallel or synchronous manner, when, for example, a single robot operates to feed workpieces into, and take out workpieces from, a plurality of processing machines, it is generally difficult to realize feeding/taking-out tasks for several workpieces subjected to different processing particulars (i.e., different production cycles) together in one series of operation programs. Usually, a feeding and taking-out task for a workpiece relative to a single processing machine is realized by a robot operation program for a single work unit, and operation programs, each for a single work unit, are prepared so as to match the respective processing machines. Then, in accordance with a command from an upper controller, the robot performs the feeding and taking-out task for a workpiece relative to each processing machine as commanded. In this connection, until an operation program for one processing machine is completed, the robot does not start an operation program for another processing machine. According to this configuration, even if a process, such as an air blowing or an axis moving in a processing machine, which tends to take a relatively long time, is to be performed between a workpiece feeding step and a workpiece taking-out step, the robot simply waits for the finish of this process.

According to a configuration such that, as described in JP-A-2004-185228, a single cycle task is divided into several work units that in turn are instructed to a robot and a processing machine, it is possible to perform feeding and taking-out tasks for workpieces relative to respective processing machines in a parallel manner, for each work unit representing a certain task (e.g., a feeding) common to the processing machines. However, in this configuration, the robot performs a subsequent work unit only after completing one work unit, so that, in a case where time (e.g., a processing time) required to perform a common work unit is different for the respective workpieces, a cycle time of the feeding and taking-out tasks for workpieces relative to all processing machines is dominated by a workpiece involving a time-consuming work unit. In other words, it is difficult, in this configuration, to effectively reduce the waiting time of the robot and thus to efficiently perform the tasks, while comprehending the operating state of the manufacturing system as occasion demands.

On the other hand, in a case where a manufacturing system stops in an emergency due to a machine trouble or the like, an operator sometimes intervenes manually in the system by, e.g., manually removing a workpiece from a jig, manually switching on/off a signal, manually transferring a robot to a retreated position, so as to check or eliminate the cause of the emergency stop. When the operator manually intervenes in the operation of the manufacturing system, the state of the manufacturing system alters from the state at the instant of the emergency stop and thus loses a correlation with the operation program of the robot, so that the task cannot be restarted as it is. Therefore, a certain recovery work is necessarily performed, such that the state of the manufacturing system is manually altered so as to match the particulars of the operation program at the restarting thereof, or the robot is artificially operated by certain steps so as to allow the interrupted operation program to be matched with the state of the manufacturing system. In order to properly perform this recovery work, the operator is required to well understand the configuration of the equipment of the manufacturing system and/or the contents of the operation programs executed by the respective machines.

SUMMARY OF THE INVENTION

It is an object of the present invention to provide device and method, for controlling a robot, which can solve the above-described several problems in a manufacturing system using a robot.

It is another object of the present invention to provide a robot controller or a robot control method, capable of making a single robot efficiently perform tasks relating to a plurality of workpieces in a parallel or synchronous manner, while comprehending the operating state of the manufacturing system as occasion demands.

It is a further object of the present invention to provide a robot controller or a robot control method, capable of restarting a task of a robot surely and safely, regardless of the operator's understanding of a manufacturing system, when the manufacturing system stops due to an emergency.

To accomplish the above object, the present invention provides a device of controlling a robot; the device making the robot execute tasks including a plurality of work units in a parallel manner for several workpieces, in accordance with a plurality of operation programs for individually commanding the plurality of work units; each of the plurality of operation programs including a description of a task starting condition as a precondition for starting a corresponding work unit by the robot; the device comprising an information collecting section collecting state information showing, in real time, a state of an environment allowing the robot to execute the tasks; a program selecting section selecting a first executable program satisfying the task starting condition, from operation programs ready to be executed for workpieces among the plurality of operation programs, based on the state information collected by the information collecting section; a processing section processing, for execution, the first executable program selected by the program selecting section; and a program-completion judging section judging whether the processing section has completed or not a processing of the first executable program; wherein the program selecting section selects, based on the state information, a second executable program satisfying the task starting condition, from the operation programs ready to be executed, as an operation program to be subsequently processed for execution by the processing section, so as to meet a situation of judgment performed by the program-completion judging section.

In the above device of controlling the robot, the program selecting section may specify, based on the state information, a certain number of operation programs, ready to be executed for workpieces, among the plurality of operation programs, and select one first executable program from among the operation programs as specified, in accordance with a predetermined rule.

Also, the program selecting section may specify the operation programs ready to be executed, by referring to a plurality of operation scripts defining an execution order of the plurality of operation programs in connection respectively with the workpieces.

The above device for controlling the robot may be configured such that, before the program-completion judging section judges that the processing section has completed the processing, the program selecting section selects the second executable program and the processing section processes, for execution, the second executable program.

Each of the plurality of operation programs may include a description of a task completing condition as a precondition for completing a corresponding work unit by the robot. In this arrangement, the program-completion judging section may judge, based on the state information collected by the information collecting section, whether the first executable program satisfies the task completing condition, and thereby judges whether the processing section has completed the processing.

The program-completion judging section may be provided with internal information showing a state of an internal model provided by modeling the environment allowing the robot to execute the tasks, and may judge whether the internal information coincides with the state information collected by the information collecting section, thereby judging whether the processing section has completed the processing.

Further, the program-completion judging section may judge whether a predetermined time has elapsed before judging that the processing section has completed the processing.

The above device for controlling the robot may further comprise a stop controlling section making the robot stop by emergency during execution of the tasks; a state judging section provided with internal information showing a state of an internal model provided by modeling the environment allowing the robot to execute the tasks, and judges whether the internal information coincides with the state information collected by the information collecting section; and a restart controlling section for canceling an emergency stop and restarting the tasks, when the state judging section judges that the internal information coincides with the state information.

The present invention also provides a method of controlling a robot; the method making the robot execute tasks including a plurality of work units in a parallel manner for several workpieces, in accordance with a plurality of operation programs for individually commanding the plurality of work units; each of the plurality of operation programs including a description of a task starting condition as a precondition for starting a corresponding work unit by the robot; the method comprising collecting state information showing, in real time, a state of an environment allowing the robot to execute the tasks; selecting a first executable program satisfying the task starting condition, from operation programs ready to be executed for workpieces among the plurality of operation programs, based on the state information as collected; processing, for execution, the first executable program as selected; selecting a second executable program satisfying the task starting condition, from the operation programs ready to be executed, based on the state information as collected, so as to meet a situation of processing of the first executable program; and processing, for execution, the second executable program as selected.

BRIEF DESCRIPTION OF THE DRAWINGS

The above and other objects, features and advantages of the present invention will become more apparent from the following description of preferred embodiments in connection with the accompanying drawings, wherein:

FIGS. 17A, 17B, 18A, 18B, 19, 20A, 20B and 21 are illustrations showing an operation sequence of a control program used in the manufacturing system of FIG. 5; and FIG. 22 is an illustration showing a condition process table used in the manufacturing system of FIG. 5.

DETAILED DESCRIPTION

Figure 1:
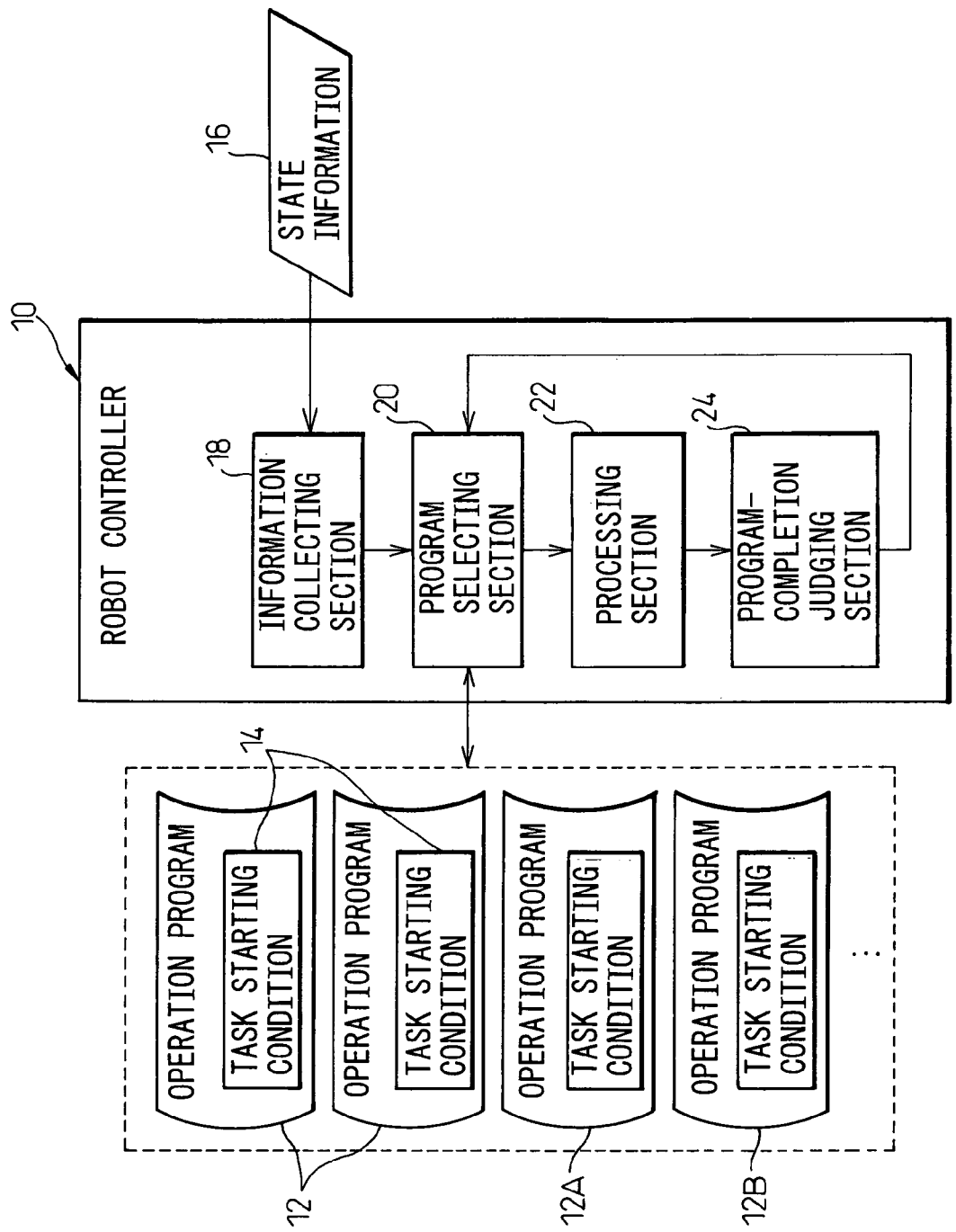
FIG. 1 is a functional block diagram showing a basic configuration of a robot controller according to the present invention.

The embodiments of the present invention are described below, in detail, with reference to the accompanying drawings. In the drawings, the same or similar components are denoted by common reference numerals.

Referring to the drawings, FIG. 1 shows in a functional block diagram a basic configuration of a robot controller (or a device for controlling a robot) 10 according to the present invention. The robot controller 10 is configured to make a robot execute tasks including a plurality of work units in a parallel or synchronous manner for several workpieces, in accordance with a plurality of operation programs 12 for individually commanding the plurality of work units. Each of the plurality of operation programs 12 includes a description of a task starting condition 14 as a precondition for starting a corresponding work unit by the robot. The robot controller 10 includes an information collecting section 18 collecting state information 16 showing, in real time, a state of an environment allowing the robot to execute the tasks; a program selecting section 20 selecting a first executable program 12A satisfying the task starting condition 14, from operation programs ready to be executed for several workpieces among the plurality of operation programs 12, based on the state information 16 collected by the information collecting section 18; a processing section 22 processing, for execution, the first executable program 12A selected by the program selecting section 20; and a program-completion judging section 24 judging whether the processing section 22 has completed or not a processing of the first executable program 12A. The program selecting section 20 selects, based on the state information 16, a second executable program 12B satisfying the task starting condition, from the operation programs ready to be executed, as an operation program to be subsequently processed for execution by the processing section, so as to meet a situation of judgment performed by the program-completion judging section 24.

According to the robot controller 10 having the above basic configuration, it is possible, by referring, in real time, to the state of the working environment of the robot, to properly select the first executable program 12A satisfying the task starting condition 14 from operation programs ready to be executed, thereby making the robot execute the corresponding work unit. Further, it is possible, while considering the progress state of the processing of the first executable program 12A, to properly select the second executable program 12B satisfying the task starting condition 14 and thus to make the robot execute the subsequent work unit. Therefore, in the manufacturing system using the robot, the robot controller 10 can make a single robot efficiently perform the tasks relating to a plurality of workpieces in a parallel or synchronous manner, while comprehending the operating state of the manufacturing system as occasion demands.

The above characteristic effects become more exceptional in a configuration wherein, before the program-completion judging section 24 judges that the processing section 22 has completed the processing of the first executable program 12A, the program selecting section 20 selects the second executable program 12B and the processing section 22 processes, for execution, the second executable program 12B.

Figure 2:
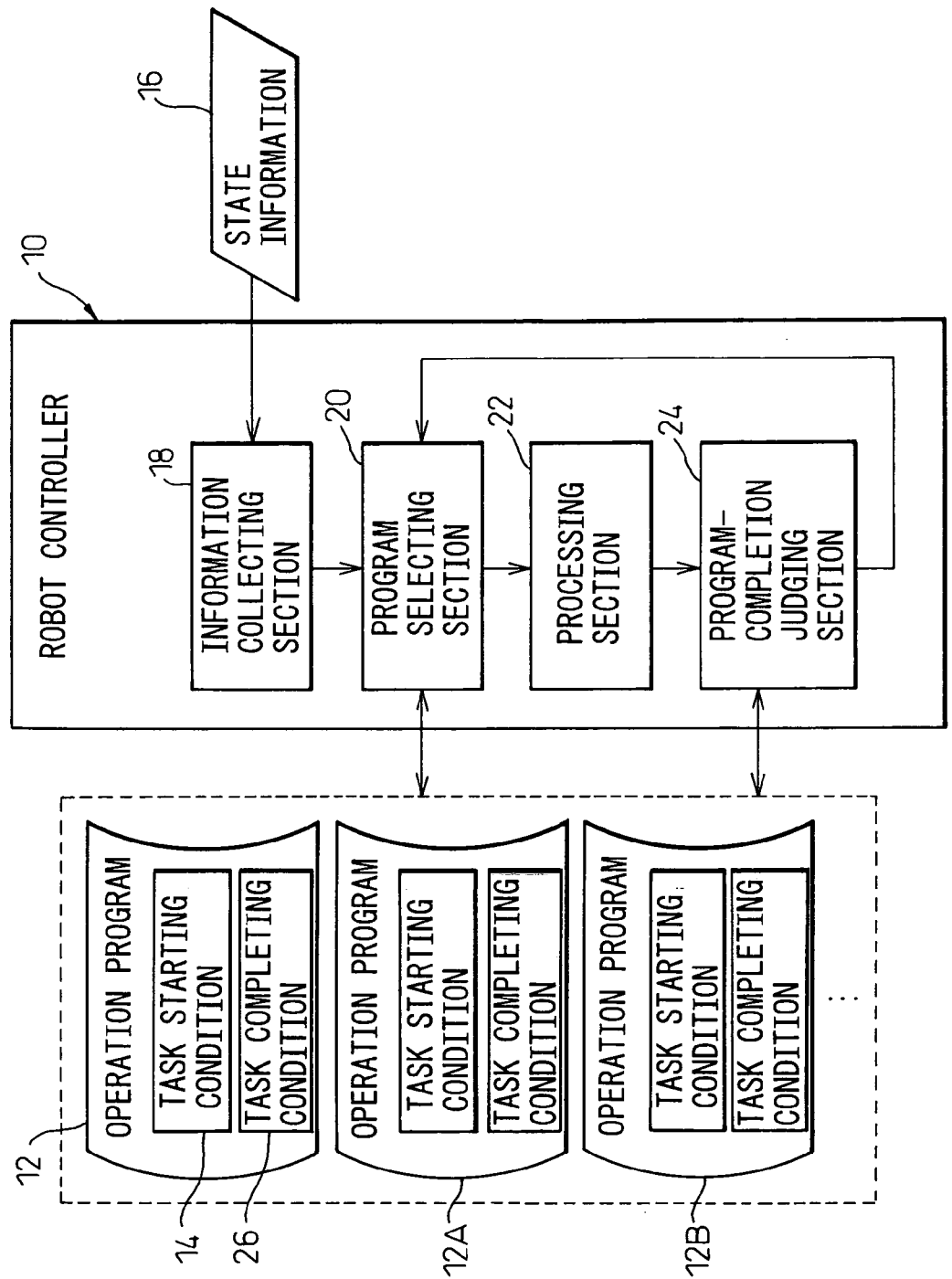
FIG. 2 is a functional block diagram showing a first development of the robot controller of FIG. 1.

FIG. 2 shows, in a functional block diagram, a first development of the robot controller 10 of FIG. 1. In the robot controller 10 shown in FIG. 2, each of the plurality of operation programs 12 further includes a description of a task completing condition 26 as a precondition for completing a corresponding work unit by the robot. In this arrangement, the program-completion judging section 24 judges, based on the state information 16 collected by the information collecting section 18, whether the first executable program 12A satisfies the task completing condition 26, and thereby judges whether the processing section 22 has completed the processing of the first executable program 12A.

According to the robot controller 10 shown in FIG. 2, it is possible, by referring to the state of the working environment of the robot in real time, to promptly and accurately judge whether the processing section 22 has completed the processing, on the basis of the judgment about whether the first executable program 12A satisfies the task completing condition 26.

Figure 3:
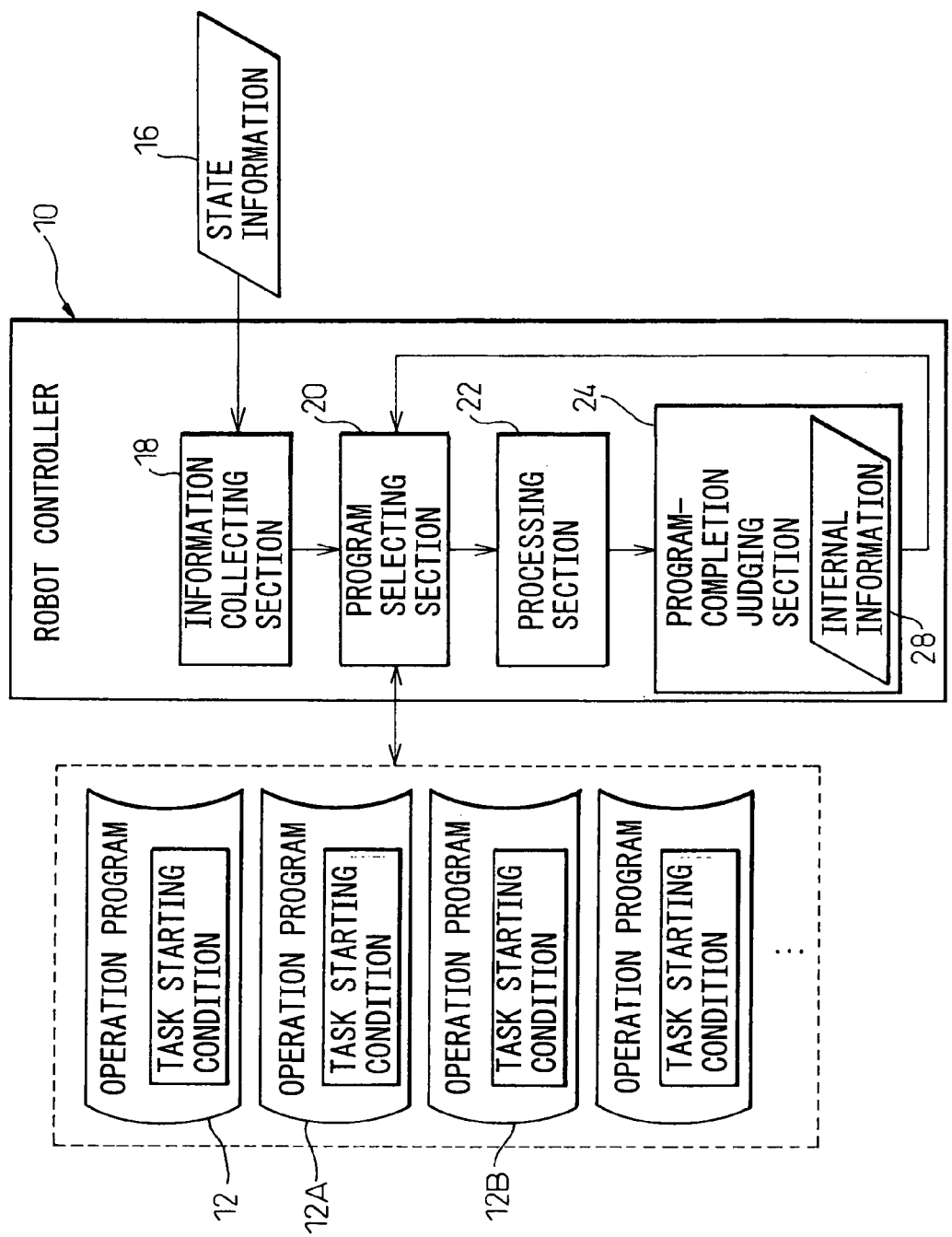
FIG. 3 is a functional block diagram showing a second development of the robot controller of FIG. 1.

FIG. 3 shows, in a functional block diagram, a second development of the robot controller 10 of FIG. 1. In the robot controller 10 shown in FIG. 3, the program-completion judging section 24 is provided with internal information 28 showing a state of an internal model provided by modeling the environment allowing the robot to execute the tasks, and judges whether the internal information 28 coincides with the state information 16 collected by the information collecting section 18, thereby judging whether the processing section 22 has completed the processing of the first executable program 12A.

According to the robot controller 10 shown in FIG. 3, it is possible to promptly and accurately judge whether the processing section 22 has completed the processing, on the basis of the judgment about whether the state information 16, showing the actual state of the environment allowing the robot to operate, coincides with the internal information 28 free of influences of the actual state of the environment. Based on this configuration, in the case where the processing for execution by the processing section 22 has been abnormally completed, it is possible to promptly detect the abnormal completion and thus to take proper measures.

Figure 4:
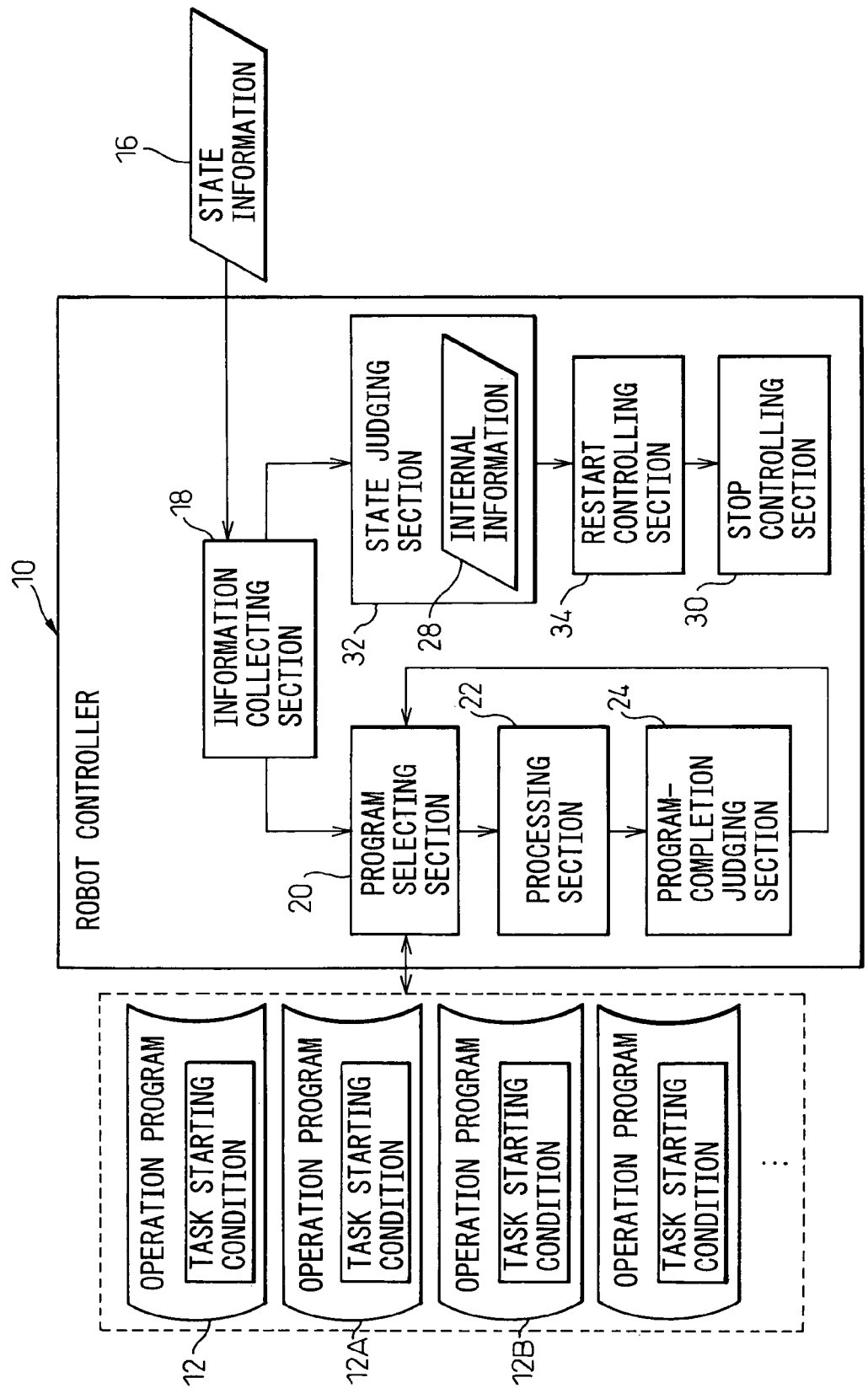
FIG. 4 is a functional block diagram showing a third development of the robot controller of FIG. 1.

FIG. 4 shows, in a functional block diagram, a third development of the robot controller 10 of FIG. 1. The robot controller 10 shown in FIG. 4 further includes a stop controlling section 30 making the robot stop by emergency during the execution of the tasks; a state judging section 32 provided with internal information 28 showing a state of an internal model provided by modeling the environment allowing the robot to execute the tasks, and judges whether the internal information 28 coincides with the state information 16 collected by the information collecting section 18; and a restart controlling section 34 canceling the emergency stop and restarting the tasks, when the state judging section 32 judges that the internal information 28 coincides with the state information 16.

According to the robot controller 10 shown in FIG. 4, in the case where the manufacturing system using a robot has been stopped by an emergency, it is possible to cancel the emergency stop and restart the operation, on the basis of the judgment about whether the state information 16, showing the actual state of the environment allowing the robot to operate, coincides with the internal information 28 free of influences of the actual state of the environment. Therefore, even when an operator has little understanding of the manufacturing system, the operator can safely and surely restart the tasks of the robot.

The configuration of the robot controller 10 according to the present invention will be further explained below, by way of examples concerning the operation program 12.

Each of a plurality of work units, executed by a robot under the instruction of the robot controller 10, is a part of a single cycle task performed by the robot for one workpiece, so that it is possible to completely perform the single cycle task by executing the plurality of work units in a certain working order. In this connection, a data list defining the order of execution of the plurality of operation programs 12 commanding the plurality of work units is referred to as an operation script, in the present application. The operation script is prepared by describing data in the form of a plurality of lines and arranging them in the working order, each line of data including the descriptions of a name of a work unit, a name of a device or machine used in execution of the work unit and an operating state of the device or machine.

The operating state of the device or machine equipped in the manufacturing system will vary as a manufacturing process proceeds. For example, a processing machine generally exhibits two broadly-distinguished states, i.e., "during operation" and "during halt", but may be considered to exhibit several strictly-distinguished states, i.e., "during power-off", "during initialization", "during waiting for processing command", "during preparation of processing", "during waiting for workpiece", "during processing of first process", "during setting-up workpiece", "during processing of second process", "during waiting for extraction of finished product", "during occurrence of alarm" and "during terminating of processing". The state of the environment in which the robot performs the tasks (i.e., the operating state of the device or machine in the manufacturing system) can be expressed by using a set of finite states as described above, an initial state, and a state transition showing the process of transit from the initial state to the other state under a specific condition. In general, the state set, the state transition and the initial state are different for respective devices or machines. Even when the devices or machines have an identical structure, the state set, the state transition and the initial state may also be different if the functions of the devices or machines change in the manufacturing system. Therefore, it is possible to accurately express the states of respective devices or machines in the manufacturing system, by using the state set, the state transition and the initial state.

Examples of the descriptions in the respective lines of an operation script are described below. For example, a work unit for holding a workpiece placed on a provisional table is named "Pick on a table"; this work unit needs two devices of "Table" and "Robot"; and the work unit can be started when the initial (or current) states of these devices are "Have on table" and "Empty handed", respectively. These particulars are described in the operation script as follows;

<Do Pick on a table, condition Table:Have on table, condition Robot:Empty handed/>

Also, the operation script can describe an operation such that, as a result of executing the work unit "Pick on a table", "Table" transits from the "Have on table" state to an "Empty on table" state and "Robot" transits from the "Empty handed" state to a "Grasping in hand" state. These particulars are described in the operation script as follows:

<Do Pick on a table, condition Table:Have on table, result Table:Empty on table, condition Robot:Empty handed, result Robot:Grasping in hand/>

In the typical manufacturing system, manufacturing processes for a plurality of products are progressed in a parallel or synchronous manner, so as to increase a production volume. As an example, a processing system including four palettes; "palette#1", "palette#2", "palette#3", "palette#4"; and two provisional tables; "table#1", "table#2"; will be examined. In this system, it is assumed that the robot performs a plurality of work units, for "machine#1", such as to take out an unprocessed workpiece from "palette#1" and temporarily place it on "table#1"; to take out a processed workpiece from "machine#1" and temporarily place it on "table#1"; to pick up the unprocessed workpiece temporarily placed on "table#1" and feed it to "machine#1"; and to pick up the processed workpiece temporarily placed on "table#1" and place it on "palette#2"; while that the robot performs a plurality of work units, for "machine#2", such as to take out an unprocessed workpiece from "palette#3." and temporarily place it on "table#2"; to take out a processed workpiece from "machine#2" and temporarily place it on "table#2"; to pick up the unprocessed workpiece temporarily placed on "table#2" and feed it to "machine#2"; and to pick up the processed workpiece temporarily placed on "table#2" and place it on "palette#4". In this connection, the feeding/taking-out tasks for the workpieces are performed in a parallel manner such that, relative to the two processing machines, two unprocessed workpieces to be processed by the respective processing machines are first placed on the respective provisional tables, the unprocessed workpieces are next exchanged to the respective processed workpieces, and the processed workpieces from the respective processing machines are last placed on the pallets. The operation script prepared by describing all work units executed by the robot, simply in a time series fashion in several lines, is as follows:

```
<Do Pick on palette#1/>
<Do Put on table#1/>
<Do Pick on pallet#3/>
<Do Put on table#2/>
<Do Unload from machine#1/>
<Do Put on table#1/>
<Do Pick on table#1/>
<Do Load to machine#1/>
<Do Unload from machine#2/>
<Do Put on table#2/>
<Do Pick on table#2/>
<Do Load to machine#2/>
<Do Pick on table#1/>
<Do Put on palette#2/>
<Do Pick on table#2/>
<Do Put on pallet#4/>
```

Each of the above lines represents a single work unit, and the robot executes the task along the above description order. However, in this operation script, the contents of the processes performed by the processing machines for the respective workpieces cannot be found, so that, if a processing time in "machine#1" is different from a processing time in "machine#2", an unnecessary waiting time during which the robot performs no operation occurs before <Do Unload from machine#1/>, or before <Do Unload from machine#2/>. In order to resolve this waiting time, it is necessary to investigate in detail the description order of the work units, and thus it is extremely difficult for an unskilled operator to prepare the operation script. Further, if a processing time or a type of workpiece is modified, it is necessary to verify the validity of the operation script.

In this context, in the present invention, the operation script is prepared while directing attention to the flows of the respective workpieces along the manufacturing process. In the case of the above task example, "workpiece#1" being processed in "machine#1" and "workpiece#2" given as a material from "palette#1" are transferred through the common "table#1", and "workpiece#3" being processed in "machine#2" and "workpiece#4" given as a material from "palette#3" are transferred through the common "table#2". Thus, the operation script for "workpiece#1" and "workpiece#2" is prepared as follows:

```
<Do Pick on palette#1/>
<Do Put on table#1/>
<Do Unload from machine#1/>
<Do Put on table#1/>
<Do Pick on table#1/>
<Do Load to machine#1/>
<Do Pick on table#1/>
<Do Put on palette#2/>
```

On the other hand, the operation script for "workpiece#3" and "workpiece#4" is prepared as follows:

```
<Do Pick on palette#3/>
<Do Put on table#2/>
<Do Unload from machine#2/>
<Do Put on table#2/>
<Do Pick on table#2/>
<Do Load to machine#2/>
<Do Pick on table#2/>
<Do Put on palette#4/>
```

Each of the above two operation scripts expresses how the manufacturing process proceeds for each workpiece, and thus can be extremely easily prepared without skill. Then, in order to resolve the above-described unnecessary waiting time, the following measure is adopted:

First, in each operation script, a provision is made such that a work unit to be subsequently executed can be clearly indicated by a pointer. In general, the operation script is prepared for a workpiece when the production concerning the workpiece is required in the manufacturing system, and thus, when the operation script is prepared, the pointer indicates a first line of the operation script. The pointer shifts to a subsequent line as the manufacturing process for the workpiece proceeds, and after the work unit of the last line is finished, the entire operation script is deleted. The robot controller 10 according to the present invention is configured to refer to a task starting condition 14 described in the line indicated by the pointer, in each of a plurality of operation scripts concerning several workpieces, and confirms the current state of the device or machine prescribed in the task starting condition 14, so as to judge whether the condition is satisfied. If the task starting condition 14 of a work unit indicated by the pointer is not satisfied, the work unit cannot be performed, while if the task starting condition 14 is satisfied, the work unit can be performed.

More specifically, the robot controller 10 first checks, for all operation scripts as prepared, whether the task starting condition 14 of a work unit indicated by the pointer is satisfied, and specifies an operation script in which the condition is satisfied. The robot controller 10 then selects one operation script from among the specified operation scripts, in accordance with a predetermined rule. The following rules may be considered for this purpose: (1) production priorities are assigned to the respective operation scripts and an operation script having a highest priority must be selected; (2) an operation script having a smallest number of remaining lines must be selected; (3) an operation script having a largest number of remaining lines must be selected; (4) an operation script prepared earliest must be selected; (5) an operation script showing a shortest residual time until a designated hour of completing the production must be selected; (6) an operation script yielding a smallest number of productions having the same attribute must be selected; (7) an operation script describing a smallest number of devices or machines or a smallest number of types thereof prescribed in the task starting condition 14 must be selected; (8) an operation script describing a largest number of coinciding states of devices or machines prescribed in the task starting condition 14 must be selected; and so on. Any one of the above rules may be adopted solely, or alternatively several rules may be adopted in combination, so as to select an operation script. Also, evaluation values may be calculated on the basis of the several rules, and an operation script having a highest arithmetic average of evaluation values may be selected.

Each of the operation scripts does not describe all of working procedures performed by the robot in the manufacturing process, but describes a working procedure while directing attention to the flow of each workpiece along the manufacturing process. Therefore, each operation script can be easily prepared, allows the states of the device or machine to be easily checked, and needs not be corrected even when the set of workpieces to be manufactured in a parallel manner in the manufacturing system is changed. The types and/or the number of work units may be different for the respective types of workpieces. A special operation script may be prepared for a specific workpiece if necessary. Consequently, when a problem is found in a certain process as a result of checking the processing precision of a workpiece for which all processes have been completed, it becomes possible to prepare the operation script describing only this particular process for only this particular workpiece, so as to permit only this process to be performed again.

Also, the pointer for specifying the work unit to be subsequently executed is prepared for the operation script, so that not only the work units can be executed in a prescribed order, but also a work unit to be subsequently executed can be changed to another one while considering a result of executing the work units and/or the state of the manufacturing system. Further, it is possible to execute the processes such as to prepare an operation script when the manufacturing process starts, to delete an operation script when the manufacturing process is completed, to specify an operation script in which the task starting condition 14 in a line indicated by the pointer has been satisfied, and to select an operation script in accordance with a predetermined rule, regardless of the types and/or the number of workpieces manufactured in a parallel manner.

The operation script can have a function for allowing a device to be optionally selected. For example, assuming that the configuration of the above manufacturing system is modified to enable "workpiece#1" to "workpiece#4" to be processed any of "machine#1" and "machine#2" and to be placed on any of "table#1" and "table#2". In this arrangement, a selectable feature for "machine#1" and "machine#2" is represented by "machines", and a selectable feature for "table#1" and "table#2" is represented by "tables", so that it is possible to describe the operation script for "workpiece#1" and "workpiece#2" as follows:

```
<Do Pick on palette#1/>
<Do Put on tables/>
<Do Unload from machines/>
<Do Put on tables/>
<Do Pick on tables/>
<Do Load to machines/>
<Do Pick on tables/>
<Do Put on pallet#2/>
```

In this operation script, it is satisfactory that any one of "machine#1" and "machine#2" satisfies the task starting condition 14 in the work unit "Unload from machines", and thus "Unload" is performed for one processing machine satisfying the task starting condition 14 prior to the other. After this step, the processing machine expressed by "machines" is regarded as the processing machine subjected to "Unload". Similarly, in the work unit "Put on table" at the second line, "Put on" is performed for either of "table#1" or "table#2", satisfying the task starting condition 14, and after this step, "tables" is regarded as the table subjected to "Put on". In this way, the device or machine to be used in the work unit described in the operation script can be determined among several selectable alternatives, while referring to the task starting condition 14. A definition of selectable alternatives for devices can be described as follows:

<Select machines among machine#1, machine#2/>
<Select tables among table#1, table#2/>

In the above configuration wherein a processing machine to be used is determined in accordance with "machines" representing the selectable alternatives, it is also possible to restrict the combination of devices or machines in a manner such that "table#1" is used when "machine#1" is used, and that "table#2" is used when "machine#2" is used. The restriction of combination can be defined by descriptions as follows:

```
<Deforder machines, tables/>
<Workset machine#1, table#1/>
<Workset machine#2, table#2/>
```

The above descriptions express that, when "machine#1" is selected at "machines", "tables" must be handled as "table#1", and when "machine#2" is selected at "machines", "tables" must be handled as "table#2". The above descriptions also prescribe a processing order such that a processing machine is first determined at "machines", and a provisional table is next determined at "tables". In this arrangement, at the time of processing "Put on tables" at the second line of the operation script, a processing machine has not yet been determined, and therefore, a provisional table cannot be determined at this step. Thus, it is suitably configured that a processing machine is first determined while referring to the task starting condition 14 of "Unload from machines" at the third line, and a provisional table is thereafter determined while referring to the task starting condition 14 in the second line to match the first determined machine. After determining the provisional table, the work unit at the second line is executed. In this configuration, although a processing machine is determined by first reading the third line, the work unit of the third line is handled as to be in a reserved state until the work unit of the second line is completed, so that the task starting condition 14 in the other operation script is not satisfied.

The allocation of a device or machine by using the description of selectable alternatives can be executed through either one of two processing modes: "Ondemand" mode wherein, while executing the respective lines in the operation script one by one as described above, a device is allocated at every time when it is found that the line includes unexecuted description of selectable alternatives; and "Reservation" mode wherein, while devices or machines are allocated regarding all of the descriptions of selectable alternatives before the operation script starts, the execution of the operation script is refrained from starting until all of the devices or machines are determined. A proper one of these processing modes may be selected, depending on the scale of the manufacturing system, the complexity of the operation script, the number of necessary devices, and so on. It is also possible to choose the processing mode for every one of the operation scripts and, further, to execute the operation scripts subjected to mutually different processing modes in a parallel manner.

In the present invention, a plurality of operation programs 12 prepared for the respective work units are executed sequentially by using the operation script. When the current state of the manufacturing system matches the task starting condition 14 of the work unit, this work unit can be subsequently executed. The current state of the manufacturing system is expressed by a set of current states of devices or machines equipped in the manufacturing system. All of the devices or machines are provided with state variables representing their states. The values of the state variables are defined to correspond to the types of devices or machines, and thus the devices or machines of the same type have an identical set of the state variables. In this connection, a manufacturing system including two processing machines; "machine#1" and "machine#2"; one robot; "robot"; two provisional tables; "table#1" and "table#2"; and four palettes; "palette#1", "palette#2", "palette#3" and "palette#4"; will be examined.

Both of the state sets of "machine#1" and "machine#2" are expressed identically as <Class Machine State:PowerOff State:Initializing State:ManualOperation State:Loading State:ReadyToProcess State:Processing State:ToolChanging State:Completed State:Unloading State:AirPurging State: Empty/>. The several "State"s respectively represent the particular states of the processing machine as follows:

PowerOff . . . Power supply is not on;

Initializing . . . Power supply is on and the operation of the machine is being prepared;

ManualOperation . . . Manual operation is being performed;

Loading . . . A workpiece is being fed to the machine;

ReadyToProcess . . . Process preparation is completed and the machine is waiting for the start of processing;

Processing . . . During processing

ToolChanging . . . A processing tool is being changed

Completed . . . Processing is completed and the machine is waiting for the take-out of a processed workpiece;

Unloading . . . A processed workpiece is being taken out;

AirPurging . . . Liquid coolant on the processed workpiece is being removed;

Empty . . . No workpiece is fed and the machine is waiting for a supply of a workpiece.

The state set of "robot" is expressed as <Class Robot State:PowerOff State:Initializing State:EmptyHanded State: Carrying State:Moving State:Grasping State:AtPerch/>. The several "State"s respectively represent the particular states of the robot as follows:

PowerOff . . . Power supply is not on;

Initializing . . . Power supply is on and the operation of the robot is being prepared;

EmptyHanded . . . No object is being held by the robot;

Moving . . . The robot is moving while holding no object;

Carrying . . . The robot is transferring while holding an object;

Grasping . . . The robot is holding an object.

Both of the state sets of "table#1" and "table#2" are expressed identically as <Class Table State:Vacant State: Exist/>. The several "State"s respectively represent the particular states of the provisional table as follows;

Vacant . . . No object is being placed on the provisional table;

Exist . . . A workpiece is placed on the provisional table.

All of the state sets of "palette", "palette#2", "palette#3" and "palette#4" are expressed identically as <Class Palette State:Nosupply State:Vacant State:Afford State:Full/>. The several "State"s respectively represent the particular states of the palette as follows:

Nosupply . . . The palette has not reached a station position;

Vacant . . . No workpiece is placed on the palette;

Afford . . . A feedable workpiece is placed on the palette, or an area capable of accommodating a new workpiece is definable on the palette;

Full . . . An area capable of accommodating a new workpiece is definable on the palette.

The current state of the manufacturing system can be expressed by clarifying which one of the "State"s in the above-described respective state sets is described for each of the state variables of the respective devices or machines.

For example, when the current state of the manufacturing system is described as <ExternalWorld machine#1:Processing machine#2:Completed robot:EmptyHanded table#1:Exist table#2:vacant palette#1:Afford palette#2:Afford palette#3:Afford palette#4:Afford/>, the manufacturing system is deemed in the following state: "machine#1" is in processing; "machine#2", is in the process completed state and is waiting for the take-out of the processed workpiece; "robot" is holding no object; a workpiece is placed on "table#1"; no workpiece is placed on "table#2"; and each of "palette#1" to "palette#4" can feed an unprocessed workpiece or accommodate a processed workpiece.

The state of the manufacturing system varies from time to time, and the varying aspect of the state can also be expressed by a change in the description of the set of states. For example, assuming that the description of the above-described set of states of the manufacturing system is changed as time passed, as follows:

<ExternalWorld machine#1:Processing machine#2:Unloading robot:Carrying table#1:Exist table#2:Exist palette#1:Afford palette#2:Afford palette#3:Afford palette#4: Afford/>

From the above description, it can be read that the state of "machine#2" has changed from "Completed" to "Unloading", the state of "robot" has changed from "EmptyHanded" to "Carrying", and the state of "table#2" has changed from "Vacant" to "Exist".

The condition allowing the state variables of the respective devices or machines to change (i.e., the state transition) can be described, for example, as follows:

<Class Table FromState:Vacant ToState:Exist Transition: %Table.ExistConfirmSignal%=ON/>

<Class Table FromState:Exist ToState:Vacant Transition: %Table.ExistConfirmSignal%=OFF/>

From the above description, it can be understood that the change in the states of "table#1" and "table#2" from "Vacant" to "Exist" is made at the time when the signal "%Table.ExistConfirmSignal%" is "ON", while the change from "Exist" to "Vacant" is made at the time when the signal "%Table.ExistConfirmSignal%" is "OFF".

In the present application, the expression of the manufacturing system by using the set of states (i.e., the state information 16) as described above is referred to as an external model of the manufacturing system. In general, various switches or sensors are installed at many parts in the manufacturing system, and information from the switches or sensors is transmitted, as signals representing the states of these parts, to the robot controller 10. The robot controller 10 identifies the current states of the respective devices or machines in the manufacturing system on the basis of the various signals, so as to prepare the description of the set of states such as described above, and judges the state of the manufacturing system while referring to the description of the set of states.

The robot controller 10 may be provided with an internal model of the manufacturing system, separately from the external model. Like the external model, the internal model is a set of states of several devices or machines in the manufacturing system, and can be described, for example, as follows:

<InternalWorld machine#1:Processing machine#2:Completed robot:EmptyHanded table#1:Exist table#2:Vacant palette#1:Afford palette#2:Afford palette#3:Afford palette#4:Afford/>

While the external model expresses the changes in the signals from the sensors, etc., installed at various positions in the manufacturing system, as the changes in the state while referring to the above-described state transitions, the internal model directly expresses the changes in the state while referring to the states of the work units (i.e., the internal information 28) to be executed by the robot controller 10. For example, assuming that both the task starting condition 14 and the task completing condition 26 are defined in each work unit of the operation script, as follows:

<Do Pick on a table, condition Table:Exist, result Table: Vacant, condition Robot:EmptyHanded, result Robot:Grasping/>

The above description depicts that the work unit "Pick on a table" is capable of starting the task when the state of "Table" is "Exist" and the state of "Robot" is "EmptyHanded", and at an instant this work unit has been completed, the state of "Table" is changed to "Vacant" and the state of "Robot" is changed to "Grasping". In the external model, the state transitions of "Table" and "Robot" are defined as follows:

<Class Table FromState:Vacant ToState:Exist Transition: %Table.ExistConfirmSignal%=ON>
<Class Robot FromState:Moving ToState:EmptyHanded Transition:%Robot.CurrentMoveSpeed%=0/>
<Class Robot FromState:EmptyHanded ToState:Grasping Transition:%Robot.HandGraspedConfirmSignal%=ON>
<Class Robot FromState:Grasping ToState:EmptyHanded Transition:%Robot.HandEmptyConfirmSignal%=ON>

For example, assuming that, in the external model, when the state of "Table" is "Exist" and the state of "Robot" is "EmptyHanded", the robot controller 10 executes the work unit "Pick on a table" and holds a workpiece placed on the provisional table. It is required to close a tool (or a hand) in order to hold the workpiece, and therefore a hand closing signal "%Robot.HandGraspingCommandSignal%" is turned "ON" in this work unit. When the robot controller 10 outputs the hand closing signal, the processing of this work unit ends. In this connection, it takes about a few hundred microseconds from an instant the hand closing signal is output to an instant the hand is actually closed. In the external model, the actual closing of the hand is comprehended when the sensor signal "%Robot.HandGraspedConfirmSignal%" is turned "ON", and at this time, the state variable of "Robot" changes from the state "EmptyHanded" to the state "Grasping" in accordance with the definition of the state transition of "Robot". As a result, the task completing condition 26 of "Pick on a table" is satisfied, and it may thus be judged that "Pick on a table" has been completed.

On the other hand, for the same work unit, the state of the internal model changes prior to the state of the external model. In other words, in the internal model, the state variable is changed to the state of task completion simultaneously with the output of the hand closing signal in "Pick on a table" (i.e., before the hand is actually closed and "%Robot.HandGraspedConfirmSignal%" is turned "ON"). It may be judged that "Pick on a table" has been completed, at an instant the state set of the external mode (i.e., the state information 16) becomes completely coincident with the state set of the internal model (i.e., the internal information 28), and the next work unit may be executed accordingly.

If the external model does not coincide with the internal model after a certain time has lapsed, it may be regarded that an error has occurred in the work unit "Pick on a table". In this way, when the internal model is updated simultaneously with the execution of the work unit and the external model is updated on the basis of the actual sensor information in the work unit, and when whether the internal model coincides with the external model is verified, it is possible to judge whether the work unit has been normally completed or has been abnormally completed due to an execution failure.

As explained above, it is possible to judge the normality of the completion state of the work unit, by comparing the external model with the internal model, which express, under certain conditions different from each other, changes in the states of the devices or machines in the manufacturing system. This procedure may similarly be performed for a case where the model of a manufacturing system has been changed or where the contents of the task in a work unit have been changed. If an internal model is not provided, it is necessary to introduce, into the operation program 12, a process of judging whether the work unit has completed normally. However, such a completion judgment process must modify the contents thereof when the manufacturing process is changed. On the other hand, in the case where the normality of the completion state is judged on the basis of the comparison between the external model and the internal model, the operation program 12 is not changed and, therefore, the operation program 12 of each work unit can advantageously be used again, even when the manufacturing process has been changed.

Comparing the external model with the internal model is also effective in automatically detecting an abnormal state in company with a trouble of a device or machine by monitoring the state of the manufacturing system. During a normal period, the internal model first changes by executing the work unit, and thereafter, the external model similarly changes. On the other hand, if the external model does not coincide with the internal model even after a certain time has lapsed, or if the external model changes when the internal model does not change, it can be judged that abnormality occurs in the manufacturing system. The abnormality judgment can be executed in real time by continuously comparing the external model with the internal model, and therefore, it is possible to stop the robot or to make the robot perform an escape motion, simultaneously with the occurrence of abnormality.

The above-described abnormality detecting procedure is explained in relation to the work unit "Pick on a table" by way of example. When the task is completed regarding "Pick on a table", the state of the robot changes from "EmptyHanded" to "Grasping", both in the external model and the internal model. In this connection, if the external model remains "EmptyHanded" even after a certain time has lapsed, it is judged that "Pick on a table" has not been succeeded, while considering that "%Robot.HandGraspedConfirmSignal%" has not been turned "ON" and a state transition has not occurred. On the other hand, if the state of "Robot" has changed to "Grasping" in both the external model and the internal model within a certain time, it can be regarded that "Pick on a table" has been normally completed, and thus the next work unit is allowed to be executed.

Assuming that, during the execution of the work unit "Load to machine#1" subsequent to "Pick on a table", a workpiece held at "table#1" drops from the hand. In this case, the signal "%Robot.HandEmptyConfirmSignal%", as a held workpiece absence signal of the hand, is turned "ON", and the state of "Robot" in the external model changes from "Grasping" to "EmptyHanded" in accordance with the state transition. On the other hand, the state of "Robot" in the internal model maintains "Grasping". The difference between these states can be immediately detected by continuously comparing the internal model with the external model, and therefore, it is possible to promptly take proper measure. If the workpiece dropping from the hand is placed on "table#1" and a photo cell censor provided in "table#1" senses the presence of the workpiece, the state of "table#1" of the internal model remains "vacant" while the state of "table#1" of the external model changes from "vacant" to "exist", so that abnormality in the state of "table#1" is detected. Therefore, in addition to a certain measure for the robot, it is possible to promptly perform a proper post-treatment for the provisional table. As explained above, even when several abnormal states occur in a parallel manner in the manufacturing system, it is possible to promptly take proper measures corresponding to the contents of the respective abnormalities.

In the present application, a work unit for making the robot perform an escape motion at the time of detecting abnormality is referred to as an exception-processing work unit. Like a normal work unit, the exception-processing work unit is described, and contains the task starting condition 14 and the task completing condition 26, in the operation script. For example, it is possible to branch the normal work unit to the exception-processing work unit at an instant an abnormality occurs, by describing the operation script as follows:

```
<Do Pick on palette#1/>
<Do Put on table#1/>
<Do Unload from machine#1/>
<Do Put on table#1/>
<Do Pick on table#1, Exception Goto 2/>
<1:Do Load to machine#1/>
<Do Pick on table#1/>
<Do Put on palette#2/>
<Stop/>
<2:Do Pick on palette#1/>
<Goto 1/>
```

In the above operation script, when abnormality occurs in "Pick on table#1" at the fifth line, "Exception Goto 2" is executed. When "Goto 2" is executed, <2:Do Pick on palette#1/> at the tenth line is executed. After the work unit at the tenth line is executed, <Goto 1/> at the eleventh line is executed, and thereby the sequence returns to the work unit at the sixth line (i.e., the line next to the occurrence of abnormality). In other words, because the take-out of the workpiece from "table#1" has been unsuccessful in "Pick on table#1" at the fifth line, "Pick on palette#1" at the tenth line is executed to take out the workpiece from "pallet#1", and the workpiece is fed to "machine#1" in "Load to machine#1" at the sixth line.

As explained above, in order to perform the exception operation at the time of the occurrence of abnormality, it is required only to correct the operation script so as to add the exception-processing work unit at a proper position, without correcting individual work units set in advance. If the exception-processing work unit contains an inconvenience, it is possible to make the exception-processing work unit invalid, by only recovering the operation script to the original one.

Detecting the abnormality of the manufacturing system by comparing the external model with the internal model is also effective in safely restarting the task of the robot when the manufacturing system stops in an emergency due to a machine trouble or the like. When the manufacturing system stops in an emergency, an operator sometimes intervenes manually in the system to remove a workpiece, to operate a robot in a manual mode, to open or close a jig clamp and/or a robot hand, and so on, in order to check or eliminate the cause of the emergency stop. When the operator manually intervenes in the operation of the manufacturing system, the state of the manufacturing system alters from the state at the instant of the emergency stop and thus loses correlation with the operation program of the robot, so that the task cannot be restarted as it is. Therefore, the operator is required to properly perform a work for recovering the correlation between the state of the manufacturing system and the robot operation program 12, before restarting the task. In this connection, it is possible to properly perform the recovery work, regardless of the operator's understanding level on the manufacturing system, by using the external model and the internal model as explained above.

Assuming that, for example, an alarm occurs in the following state of the external model, and the manufacturing system stops as an emergency:
<ExternalWorld machine#1:Processing machine#2:Unloading robot:Carrying table#1:Exist table#2:Exist palette#1:Afford palette#2:Afford palette#3:Afford palette#4:Afford/>

At this time, the internal model is in the same state as follows:
<InternalWorld machine#1:Processing machine#2:Unloading robot:Carrying table#1:Exist table#2:Exist palette#1:Afford palette#2:Afford palette#3:Afford palette#4:Afford/>

Because the robot is stopped due to the alarm, the internal model maintains the above-described state. On the other hand, the state of the external model changes on the basis of the information of a sensor equipped in the manufacturing system. Therefore, for example, if the operator removes the workpiece from "table#1" in the above state, the sensor installed in "table#1" immediately detects this action, and thereby the state of "table#1" of the external model changes from "Exist" to "Vacant" as follows:
<ExternalWorld machine#1:Processing machine#2:Unloading robot:Carrying table#1:Vacant table#2:Exist palette#1:Afford palette#2:Afford palette#3:Afford palette#4:Afford/>

In this state, when a starting request is sent to the robot controller 10 in order to restart the manufacturing system, the robot controller 10 first checks whether the external model coincides with the internal model. The internal model maintains the state at an instant the robot has stopped by emergency due to the alarm. If the state of the internal model coincides with the state of the external model, it is possible to safely continue the execution of the work unit. Contrary to this, if the external model does not coincide with the internal model, problems may arise by restarting the work unit. In the above example, the state of "table#1" of the external model is different from the state of "table#1" of the internal model, so that it is possible to prevent the task from being restarted.

In this connection, when the starting request is sent to the robot controller 10, the robot controller 10 first operates, for the operator, to display the contents of the difference between the external model and the internal model (in the above example, "table#1" has changed from "Exist" to "Vacant") in a display unit additionally provided to the robot controller 10. It is further possible to request the operator to check whether it is permissible to start up the robot in this state (or to instruct a restart permission), by displaying the request in the display unit. The operator, checking the contents displayed in the display unit, can input an instruction of a restart permission or non-permission, from, for example, an input unit additionally provided to the robot. When the restart permission is input, the contents of the internal model are written to be identical to the contents of the external model, and the suspended work unit is restarted. When the restart non-permission is input, the starting up of the robot is not performed.

Further, regarding the difference between the external model and the internal model, a message of a cause and a measure to be informed to the operator can be prepared in advance, and can be displayed in the display unit at the time of requesting the restart check. In the above example, a cause of a change in the state of "table#1" of the external model from "Exist" to "Vacant", and a measure of resolving the cause are displayed. The operator can read the message, so that he can check whether the sensor of "table#1" is operating properly and/or understand that the task may be restarted if a new workpiece is manually placed on "table#1". Thus, the operator can surely recover the state at the time of the emergency stop, in the manufacturing system expressed by the external model, by following the message issued by the robot controller 10. It is advantageous that the above-described message is prepared by an operator highly understanding or familiar with the manufacturing system and is registered in the robot controller 10 in advance, so that every person can safely and surely restart the manufacturing system by following the message.

The configuration of a robot control device or robot controller 10, according to a preferred embodiment of the present invention, will be explained below with reference to FIGS. 5 to 22, in connection with an exemplary operation executed by a robot.

Figure 5:
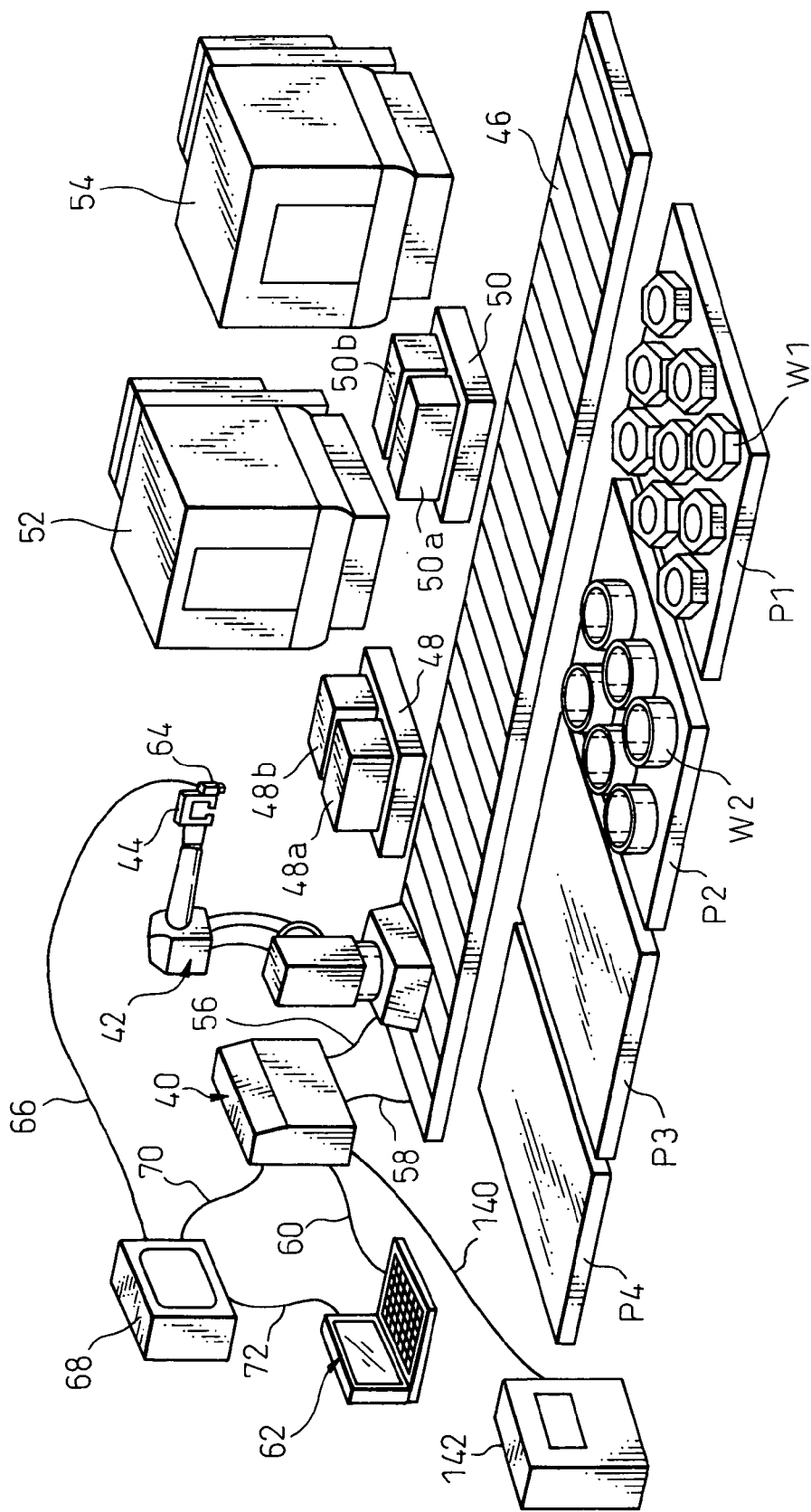
FIG. 5 is a schematic view showing entirely a manufacturing system using a robot, incorporating therein a robot controller according to a first embodiment of the present invention.

FIG. 5 is a schematic view showing an entire manufacturing system using a robot, incorporating therein a robot controller 40 according to one embodiment of the present invention. A tool (a hand, in the illustrated embodiment) 44 is attached to the end of a wrist of a robot (i.e., a robot mechanical section) 42. A plurality of workpieces W1 are placed on a pallet P1, and a plurality of workpieces W2, the type of which is different from the type of workpieces W1, are placed on a pallet P2. The robot 42 is installed on a conveyor (or a traveling axis) 46 to move along the conveyor 46, and operates to hold the workpiece W1 on the pallet P1 or the workpiece W2 on the pallet P2 by the tool 44, to carry the workpiece to a provisional table 48 or a provisional table 50, and to temporarily place the workpiece on the provisional table. The provisional table 48 is used when the workpiece is fed to a processing machine 52, and the provisional table 50 is used when the workpiece is fed to a processing machine 54.

If the processing machine 52 is not operating, the robot 42 holds the workpiece W1 or workpiece W2 placed on the provisional table 48 by the tool 44 and feeds it to the processing machine 52. The processing machine 52 starts processing the workpiece, based on a process start command sent from the robot 42. At an instant the process is completed, the processing machine 52 transmits a process completion signal to the robot 42. The robot 42 receiving the process completion signal operates to take out the processed workpiece W1 or W2 from the processing machine 52, and to place the workpiece W1 on a pallet P3 but the workpiece W2 on a pallet P4. In a case where the workpiece is fed to the processing machine 54, an operation substantially corresponding to the above-described operation is performed, except that the provisional table 50 is used.

The robot 42 and the conveyor 46 are connected to a robot controller 40 through communication cables 56 and 58, respectively, and the robot controller 40 controls the operations of the robot 42 and the conveyor 46. The robot controller 40 is connected to an operation program preparing device 62 through a network cable 60. A camera 64 is attached to the wrist end of the robot 42 and adjacent to the tool 44. The camera 64 is connected to an image processing device 68 through a camera cable 66. The image processing device 68 is connected to the robot controller 40 and the operation program preparing device 62 through network cables 70 and 72, respectively. Positioning jigs 48a, 50a for the workpiece W1 carried from the pallet P1 and positioning jigs 48b, 50b for the workpiece W2 carried from the pallet P2 are installed on the provisional tables 48, 50, respectively. The positioning jigs 48a, 48b, 50a, 50b are respectively connected to the robot controller 40 through digital signal input/output cables (not shown).

Figure 6:
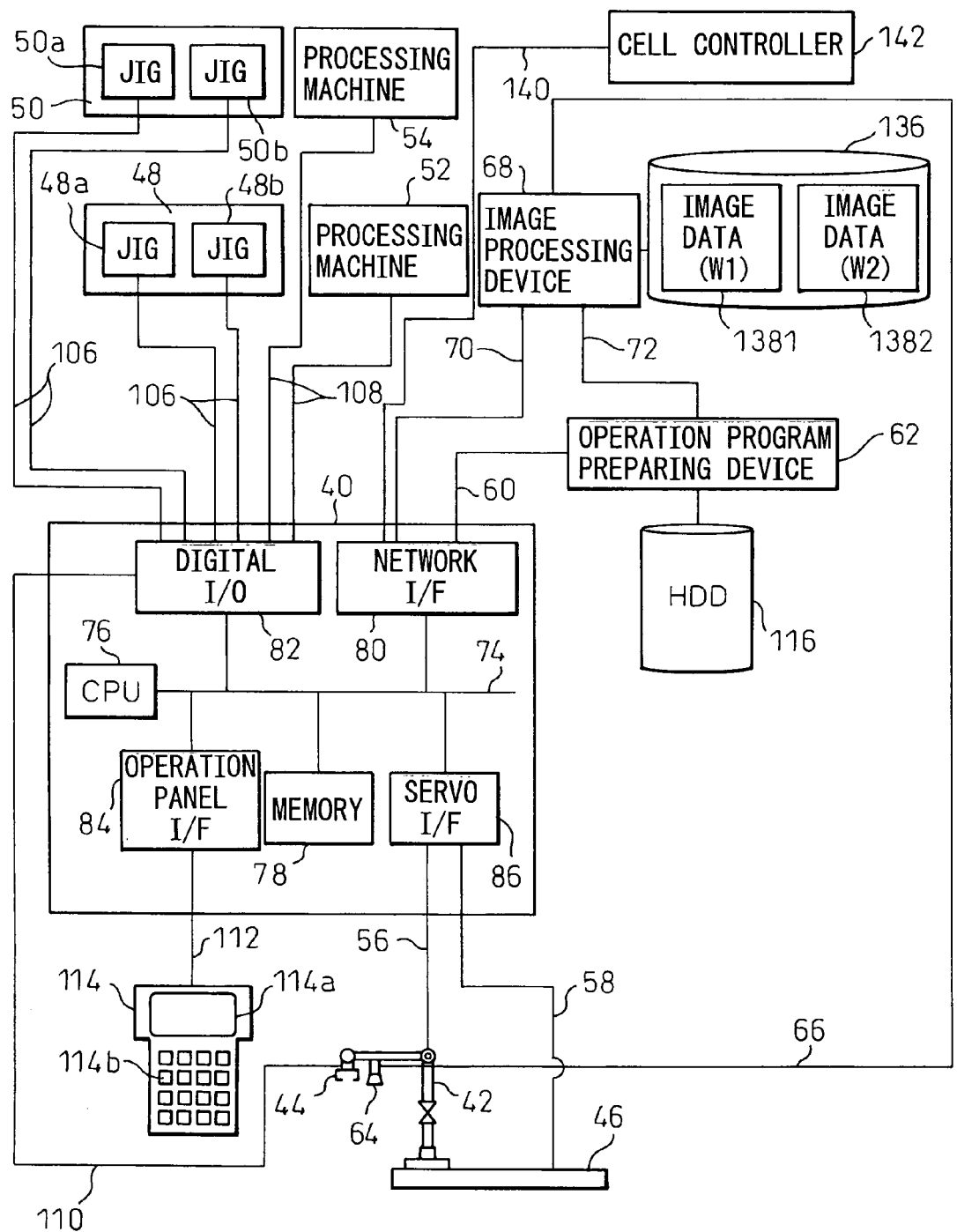
FIG. 6 is a block diagram showing a configuration of a control system in the manufacturing system shown in FIG. 5.
Figure 7:
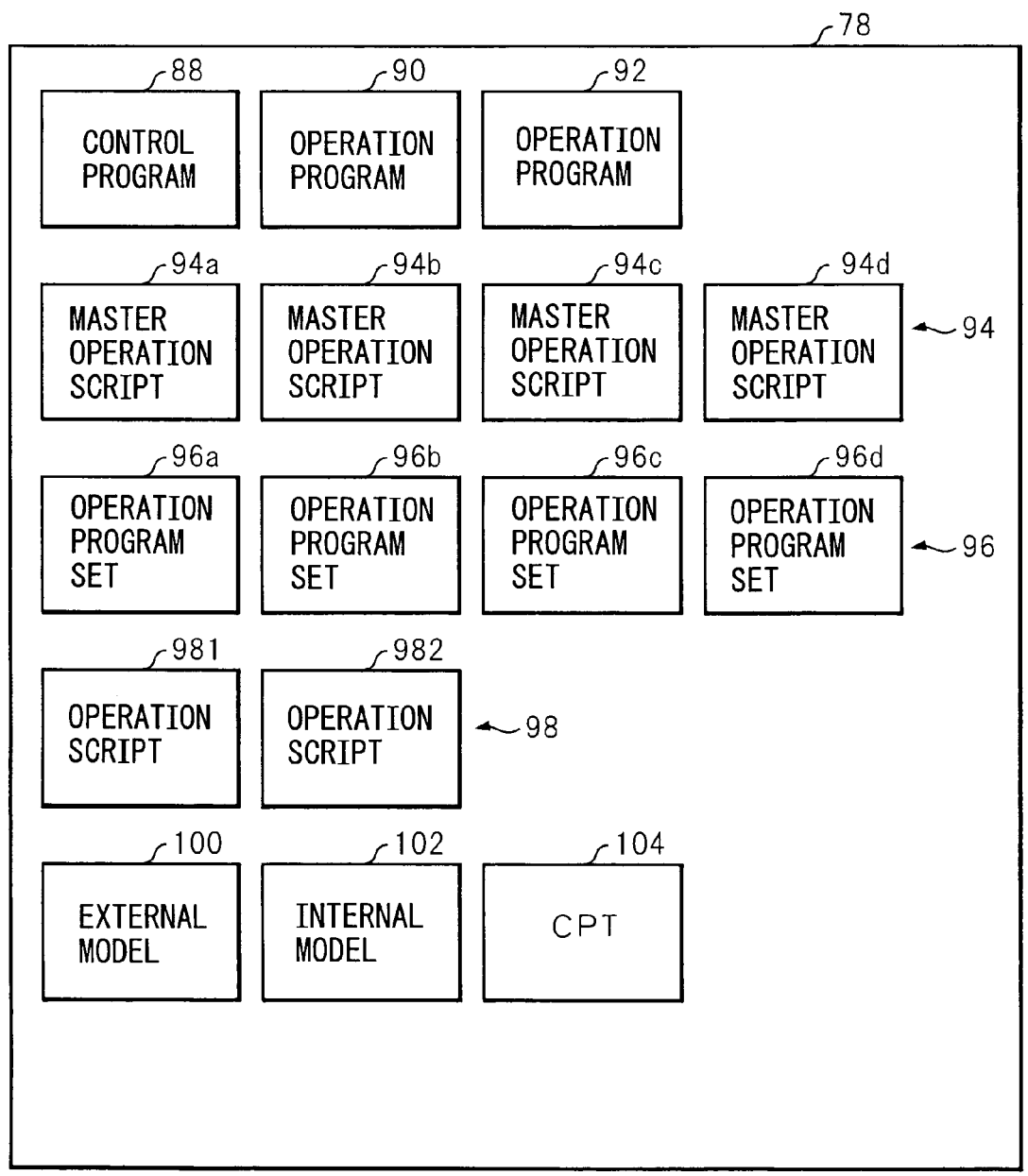
FIG. 7 is an illustration showing a memory of the robot controller in the control system of FIG. 6.

FIG. 6 is a block diagram mainly showing a configuration of a control system in the manufacturing system of FIG. 5. The robot controller 40 includes a central processing unit (CPU) 76, a memory 78, a network interface 80, a digital signal input/output circuit 82, an operating panel interface 84 and a servo interface 86, which are connected to each other through a bus 74. As shown in FIG. 7, the memory 78 stores a control program 88 adapted to be executed by the CPU 76 and to control the robot controller 40 in its entirety, and operation programs 90 and 92 adapted to make the robot 42 operate. The operation program 90 is prepared to make the robot 42 execute a task concerning the workpiece W1 by using the tool 44, and the operation program 92 is prepared to make the robot 42 execute a task concerning the workpiece W2 by using the tool 44. Each of the operation programs 90, 92 is interpreted by using the control program 88, and is translated into the operations of the robot 42 and the tool 44. The operation programs 90, 92 are prepared by the operation program preparing device 62.

The memory 78 of the robot controller 40 further stores, as described later, a master operation script 94 (94a, 94b, 94c, 94d), an operation program set 96 (96a, 96b, 96c, 96d), an operation script 98 (981, 982), an external model 100, an internal model 102 and a condition process table 104.

The network interface 80 is connected with the operation program preparing device 62 through the network cable 60, and also with the image processing device 68 through the network cable 70. The digital signal input/output circuit 82 is connected with the jigs 48a, 48b of the provisional table 48 and the jigs 50a, 50b of the provisional table 50, individually, through a digital signal input/output cable 106; with the processing machines 52, 54, individually, through a digital signal is input/output cable 108; and with the tool 44 attached to the robot 42 through a digital signal input/output cable 110.

An operating panel or teach pendant 114 is connected to the operating panel interface 84 through an operating panel cable 112. The operating panel 114 includes a display 114a and input buttons 114b. When an operator operates the operating panel 114, the robot 42 can be operated in a manual mode through the robot controller 40. Servo mechanisms, such as a servo motor of each of the control axes of the robot 42 and the conveyor 46, are connected to the servo interface 86 through the communication cables 56, 58.

Figure 8:
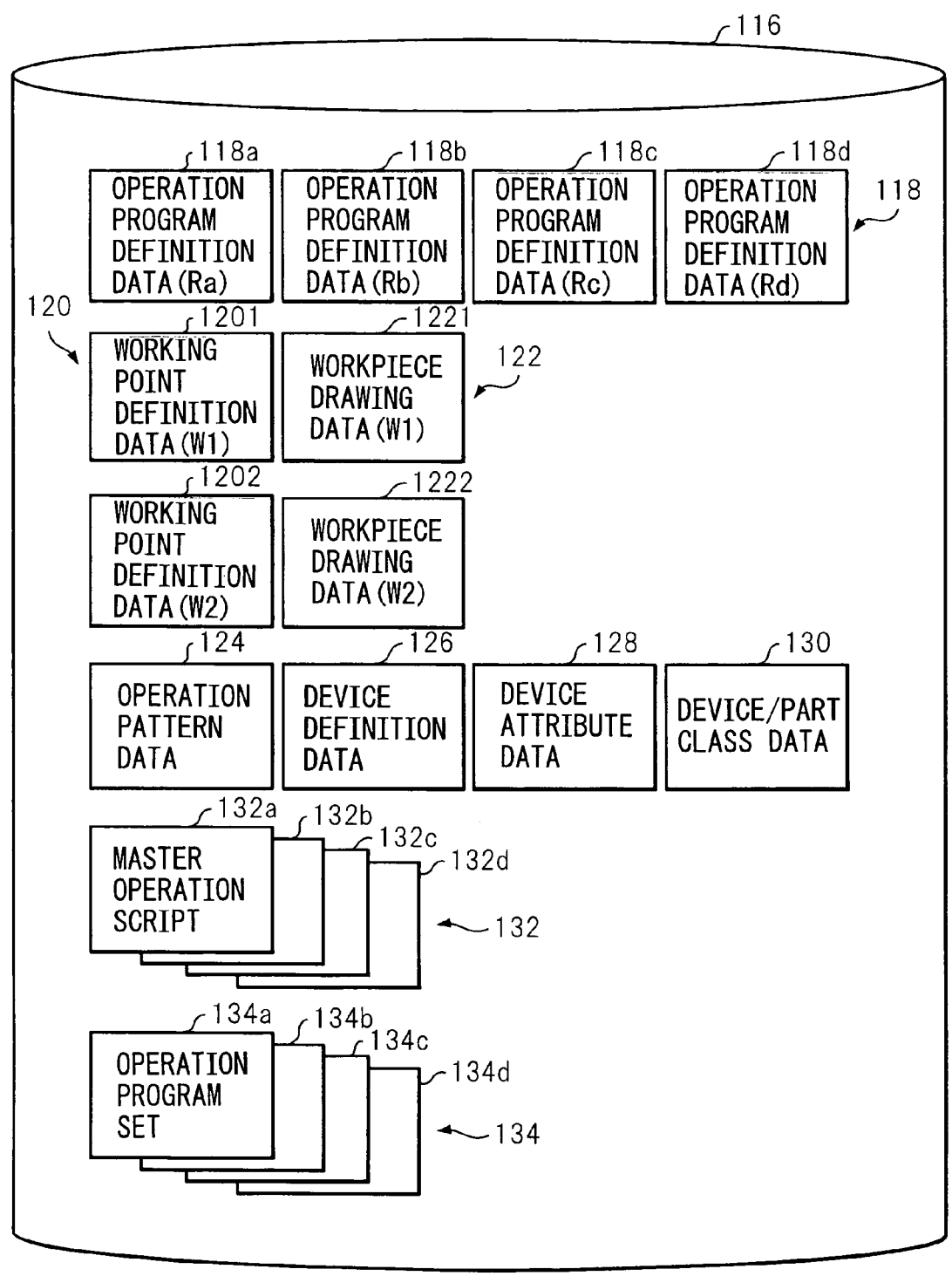
FIG. 8 is an illustration showing a hard disc device in the control system of FIG. 6.
Figure 9:
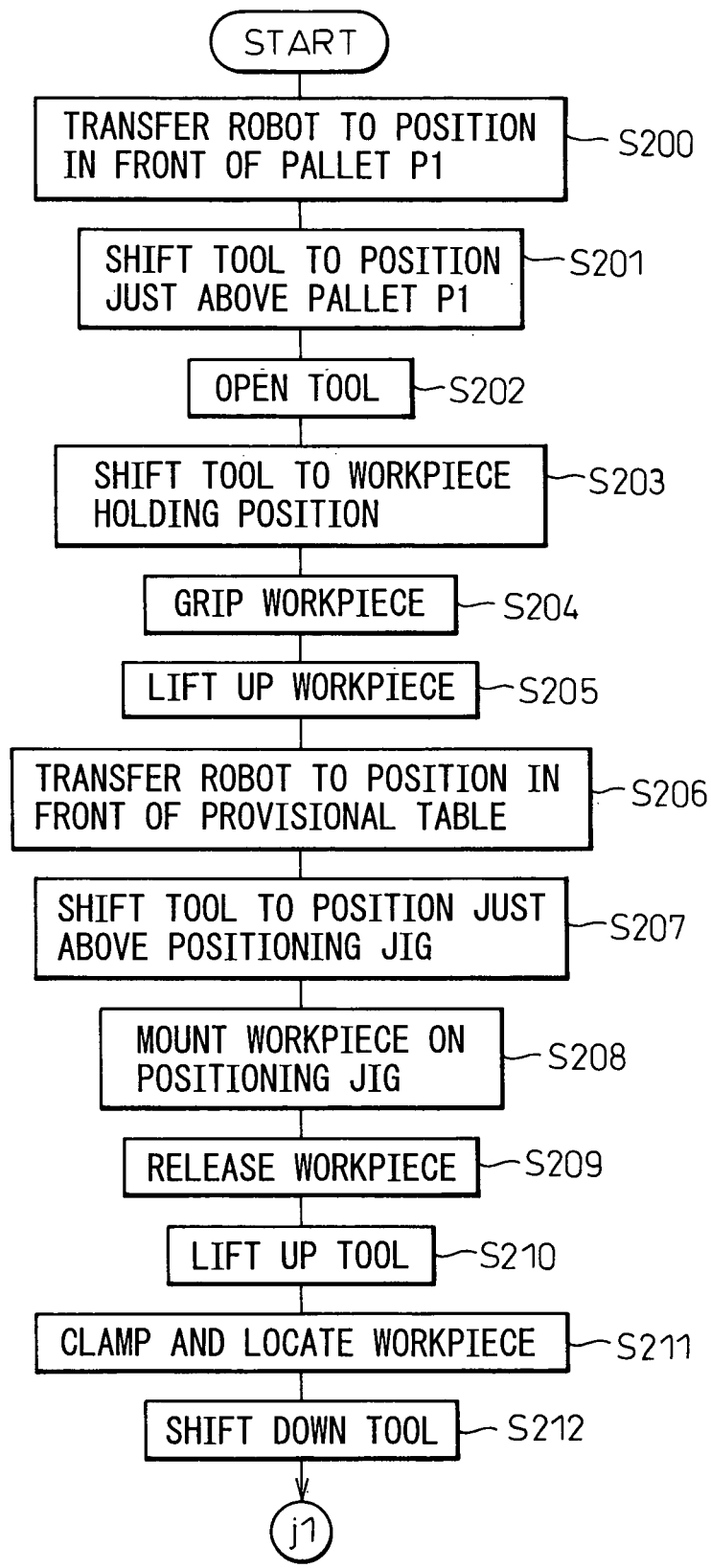
FIGS. 9, 10 and 11 are flowcharts showing a sequence of tasks performed by the robot in the manufacturing system of FIG. 5.
Figure 10:
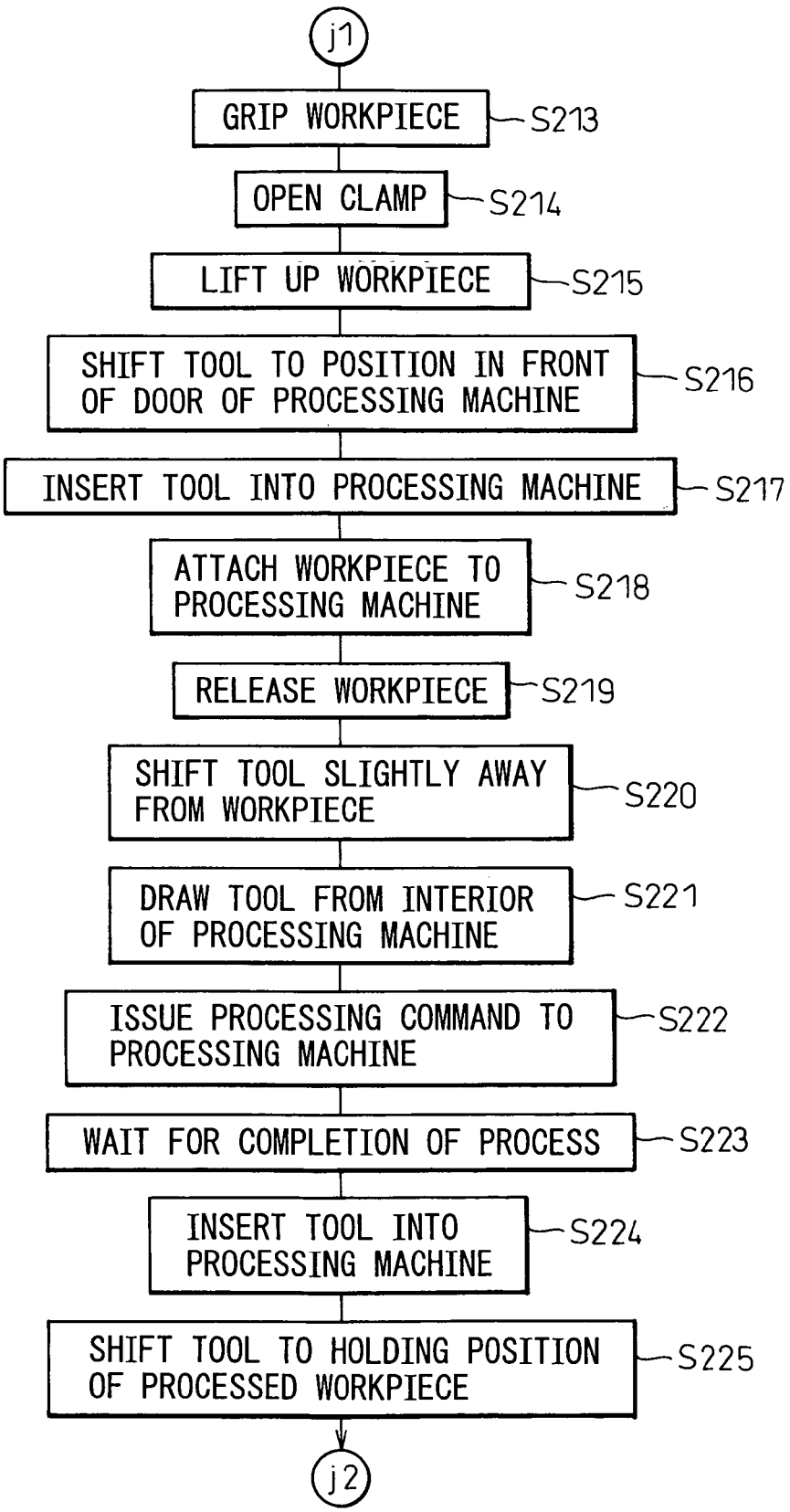
Figure 11:
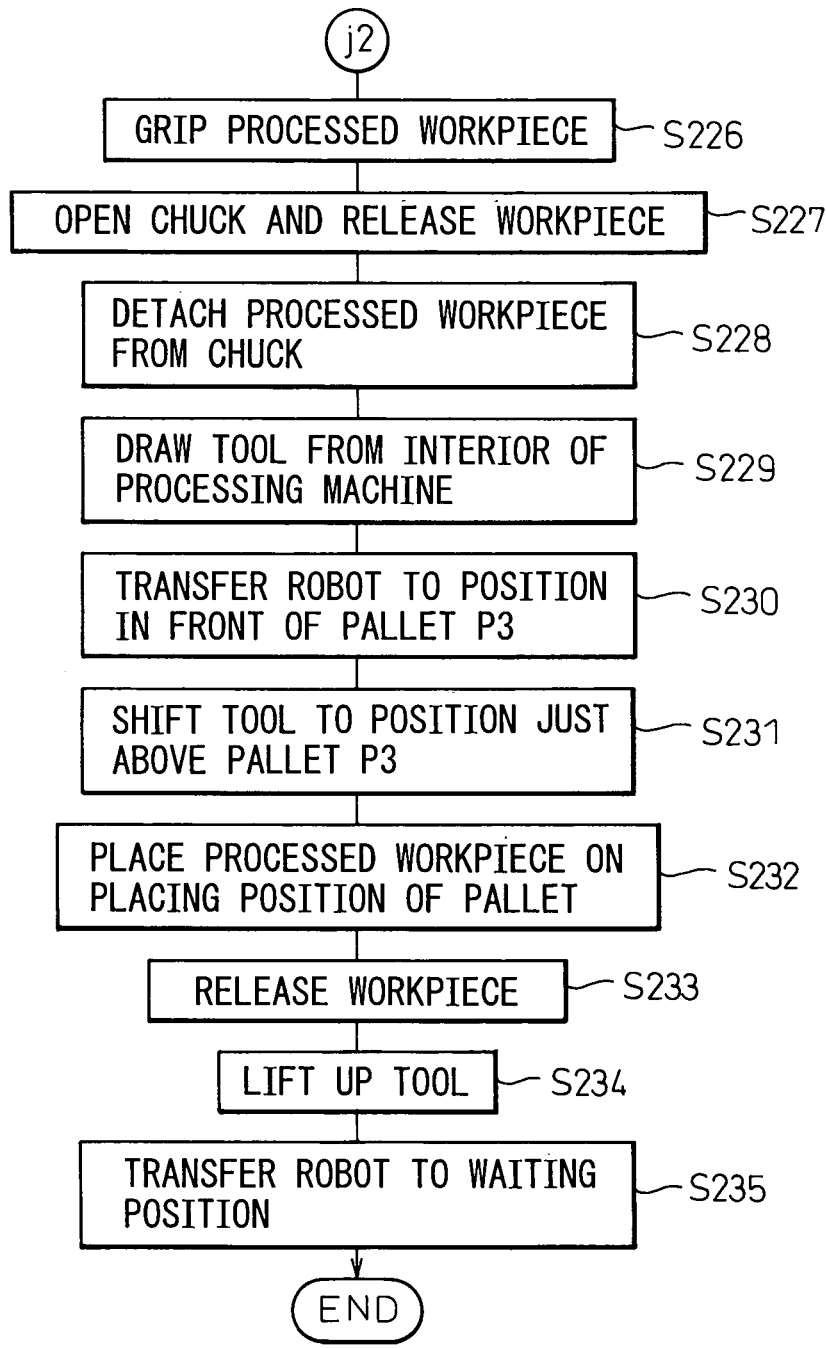

A hard disk device or drive 116 is connected to the operation program preparing device 62. Alternatively, the operation program preparing device 62 may incorporate therein the hard disk device 116. As shown in FIG. 8, the hard disk device 116 stores operation program definition data 118 (118a, 118b, 118c, 118d, in the illustrated embodiment) respectively concerning a plurality of working routes R (Ra, Rb, Rc, Rd, in the illustrated embodiment, as described later) along which the robot 42 works; working point definition data 120 (1201, 1202, in the illustrated embodiment) respectively concerning several types of workpieces W (W1, W2, in the illustrated embodiment) to be processed; and drawing or image data 122 (1221, 1222) of the workpieces W (W1, W2). Further, as described later, the hard disk device 116 stores operation pattern data 124, device definition data 126, device attribute data 128, device/part class data 130, a master operation script 132 (132a, 132b, 132c, 132d) and an operation program set 134 (134a, 134b, 134c, 134d).

The working route R of the robot 42, in the illustrated embodiment, includes the following: (1) a first working route Ra along which the robot operates to pick out the workpiece W1 from the pallet P1, to carry the workpiece W1 to the provisional table 48 and position it thereon by the positioning jig 48a, to feed the workpiece W1 to the processing machine 52, to take out the processed workpiece W1 from the processing machine 52, and to place the workpiece W1 on the pallet P3; (2) a second working route Rb along which the robot operates to pick out the workpiece W2 from the pallet P2, to carry the workpiece W2 to the provisional table 48 and position it thereon by the positioning jig 48b, to feed the workpiece W2 to the processing machine 52, to take out the processed workpiece W2 from the processing machine 52, and to place the workpiece W2 on the pallet P4; (3) a third working route Rc along which the robot operates to pick out the workpiece W1 from the pallet P1, to carry the workpiece W1 to the provisional table 50 and position it thereon by the positioning jig 50a, to feed the workpiece W1 to the processing machine 54, to take out the processed workpiece W1 from the processing machine 54, and to place the workpiece W1 on the pallet P3; and (4) a fourth working route Rd along which the robot operates to pick out the workpiece W2 from the pallet P2, to carry the workpiece W2 to the provisional table 50 and position it thereon by the positioning jig 50b, to feed the workpiece W2 to the processing machine 54, to take out the processed workpiece W2 from the processing machine 54, and to place the workpiece W2 on the pallet P4.

The operation program definition data 118a, 118b, 118c, 118d, respectively concerning the working routes Ra, Rb, Rc, Rd, are comprised of first data parts by which a robot motion is altered, depending on the types of workpieces W1, W2 to be operated by the robot 42, while second data parts by which a robot motion is not altered, depending on the types of workpieces W1, W2. The first data parts, depending on the workpiece, are prepared to have contents different for the respective workpieces W1, W2, based on the working point definition data 1201, 1202 respectively concerning the workpieces W1, W2 to be operated. As a result, the operation programs 90, 92 in connection respectively with the workpieces W1, W2 are completed.

Referring again to FIG. 6, a hard disk device or drive 136 is connected to the image processing device 68. Alternatively, the image processing device 68 may incorporate therein the hard disk device 136. The hard disk device 136 stores workpiece image data 138 (1381, 1382, in the illustrated embodiment) serving as references for the detection of the workpieces W to be operated (W1, W2, in the illustrated embodiment). The workpiece image data 1381, 1382 are obtained by photographing the images of the workpieces W1, W2 with the camera 64 attached to the wrist end of the robot 42.

Further, the robot controller 40 is connected through a network cable 140 to a cell controller 142 controlling the illustrated manufacturing system (or a cell) in an integrated way. The robot controller 40 receives a manufacturing command from the cell controller 142 through the network interface 80.

FIGS. 9 to 14 show a procedure of a task (or a handling operation) performed by the robot 42 under the control of the robot controller 40 in the above-described manufacturing system. In this connection, a handling operation for the workpiece W1 along the above-described first working route Ra concerning the provisional table 48 and the processing machine 52 is explained below, by way of example. It should be understood that a task along the other working route can be performed in a similar way.

First, the conveyor 46 is activated, and the robot 42 is transferred to a position (a taught point) in front of the pallet P1 (step S200). Next, the arm of the robot 42 is operated to turn, so as to shift the tool 44 to a position (a taught point) just above the pallet P1 (step S201). Then, a digital signal indicating "open a hand" is output to the tool 44 through the digital signal input/output circuit 82, so as to open the tool 44 (step S202).

Next, the tool 44 is shifted toward a holding position (defined on the workpiece) at which the tool holds the workpiece W1. For this motion, the tool 44 is first shifted to a position (a taught point) just above the holding position (a taught point), and thereafter is shifted toward the holding position just below the former position at a low speed (step S203). This motion requires that the orientation of the robot 42 at the time of holding the workpiece be suitably determined, depending on the type of workpiece, and thus is arranged as a workpiece-type depending motion.

Then, a digital signal indicating "close a hand" is output to the tool 44 through the digital signal input/output circuit 82 and, thereby, the tool 44 is closed to hold or grip the workpiece W1 (step S204). Thereafter, the tool 44 is shifted upward to pick out the workpiece W1 from the pallet P1. For this motion, the tool 44 is first shifted at a low speed to a position (a taught point) just above the holding position (a taught point), and thereafter is shifted at an increased speed so as to further lift up the workpiece W1 (step S205).

Next, the arm of the robot 42 is operated to turn rightward and the conveyor 46 is simultaneously operated and, thereby, the robot 42 is transferred to a position (a taught point) in front of the provisional table 48 (step S206). Next, the tool 44 is shifted to a position (a taught point) above the positioning jig 48a (step S207). Thereafter, the tool 44 is shifted toward a releasing position where the positioning jig 48a clamps the workpiece W1. For this motion, the tool 44 is first shifted to a position (a taught point) above the releasing position (a taught point), and thereafter is shifted toward the releasing position below the former position at a low speed, so as to mount the workpiece W1 on the positioning jig 48a (step S208). Then, a digital signal indicating "open a hand" is output to the tool 44 through the digital signal input/output circuit 82, so as to open the tool 44. As a result, the tool 44 releases the workpiece W1 (step S209).

Next, the tool 44 is shifted to a position (a taught point) above the releasing position (a taught point), and leaves the positioning jig 48a (step S210). Then, a digital signal indicating "close a clamp" is output to the positioning jig 48a through the digital signal input/output circuit 82, so as to close the positioning jig 48a. As a result, the workpiece W1 is accurately positioned at a predetermined position on the positioning jig 48a (step S211).

Next, the tool 44 is shifted toward a holding position (a taught point) on the workpiece W1 clamped by the positioning jig 48a (step S212). Next, the tool 44 is closed at the holding position, so as to hold or grip the workpiece W1 (step S213). Then, a digital signal indicating "open a clamp" is output to the positioning jig 48a, so as to open the positioning jig 48a (step S214). Thereafter, the tool 44 is shifted upward, so as to pick out the workpiece W1 from the positioning jig 48a. For this motion, the tool 44 is first shifted at a low speed to a diagonally upward position (a taught point) relative to the positioning jig 48a, and thereafter is shifted at an increased speed so as to further lift up the workpiece W1 (step S215).

Next, the arm of the robot 42 is operated to turn, so as to shift the tool 44 to a position (a taught point) in front of the processing machine 52 (step S216). Then, the tool 44 is inserted to an interior of the processing machine 52 through a door opening of the processing machine 52. For this motion, the arm of the robot 42 is operated to extend straight for insertion, so as to prevent the tool 44 and the workpiece W1 from contacting or colliding with the processing machine 52 (step S217). Thereafter, the tool 44 is temporarily stopped at a position (a taught point) just in front of a chuck (not shown) of the processing machine 52, and then the workpiece W1 is attached to the chuck (a taught point) at a low speed. Then, a digital signal indicating "close a chuck" is output to the processing machine 52 through the digital signal input/output circuit 82, so as to close the chuck (step S218).

Next, a digital signal indicating "open a hand" is output to the tool 44, so as to open the tool 44 and thus to release the workpiece W1 (step S219). Then, the tool 44 is shifted at a low speed to a position (a taught point) spaced at a slight distance from the chuck (step S220). Thereafter, the arm of the robot 42 is operated to extend straight, so as to prevent the tool 44 from contacting with the processing machine 52, and to draw out the tool 44 through the door opening from the processing machine 52 (step S221).

Next, a digital signal indicating "start a process for a workpiece W1" is output, as a command from the first working route Ra, to the processing machine 52 through the digital signal input/output circuit 82 (step S222). The robot waits until a digital signal indicating "complete a process for a workpiece W1" is input from the processing machine 52 to the robot controller 40 (step S223). After the workpiece W1 has been completely processed, the tool 44 is inserted into the interior of the processing machine 52 (step S224), and is shifted toward a holding position (a taught point) on the processed workpiece W1 (step S225). Then, the tool 44 is closed, so as to hold or grip the workpiece W1 (step S226).

Next, a digital signal indicating "open a chuck" is output to the processing machine 52, so as to open the chuck (step S227). Then, the tool 44 is shifted slightly from the holding position, so as to pick out the workpiece W1 straight from the chuck of the processing machine 52 (step S228). Thereafter, the tool 44 is retreated away from the processing machine 52 (step $229).

Next, the arm of the robot 42 is operated to turn rightward, and the conveyor 46 is activated to transfer the robot 42 to a position (a taught point) in front of the pallet P3 (step S230). The tool 44 is then shifted to a position (a taught point) just above the pallet P3 (step S231). Thereafter, the tool 44 is shifted to a placing position (a taught point) on the pallet P3, at which the workpiece W1 is placed, so as to place the workpiece W1 on the pallet P3. For this motion, the tool 44 is first shifted to a position (a taught point) just above the placing position, and thereafter is shifted at a low speed toward the placing position just below the former position, and thereby the workpiece W1 is placed on the pallet P3 (step S232). This workpiece placing motion requires that the orientation of the robot 42 at the time of placing the workpiece on the pallet P3 be suitably determined, depending on the type of workpiece, and thus is arranged as a workpiece-type depending motion.

Next, the tool 44 is opened, so as to release the workpiece W1 (step S233). Then, the tool 44 is shifted at a low speed to a position just above the placing position, and thereafter is shifted further upward at an increased speed (step S234). Last, the arm of the robot 42 is operated to turn toward the front of the robot, and the conveyor 46 is activated to transfer the robot 42 to an initial wait position (step S235). In this manner, the operation program 90 for the workpiece W1 in the first working route Ra is completed.

Figure 12:
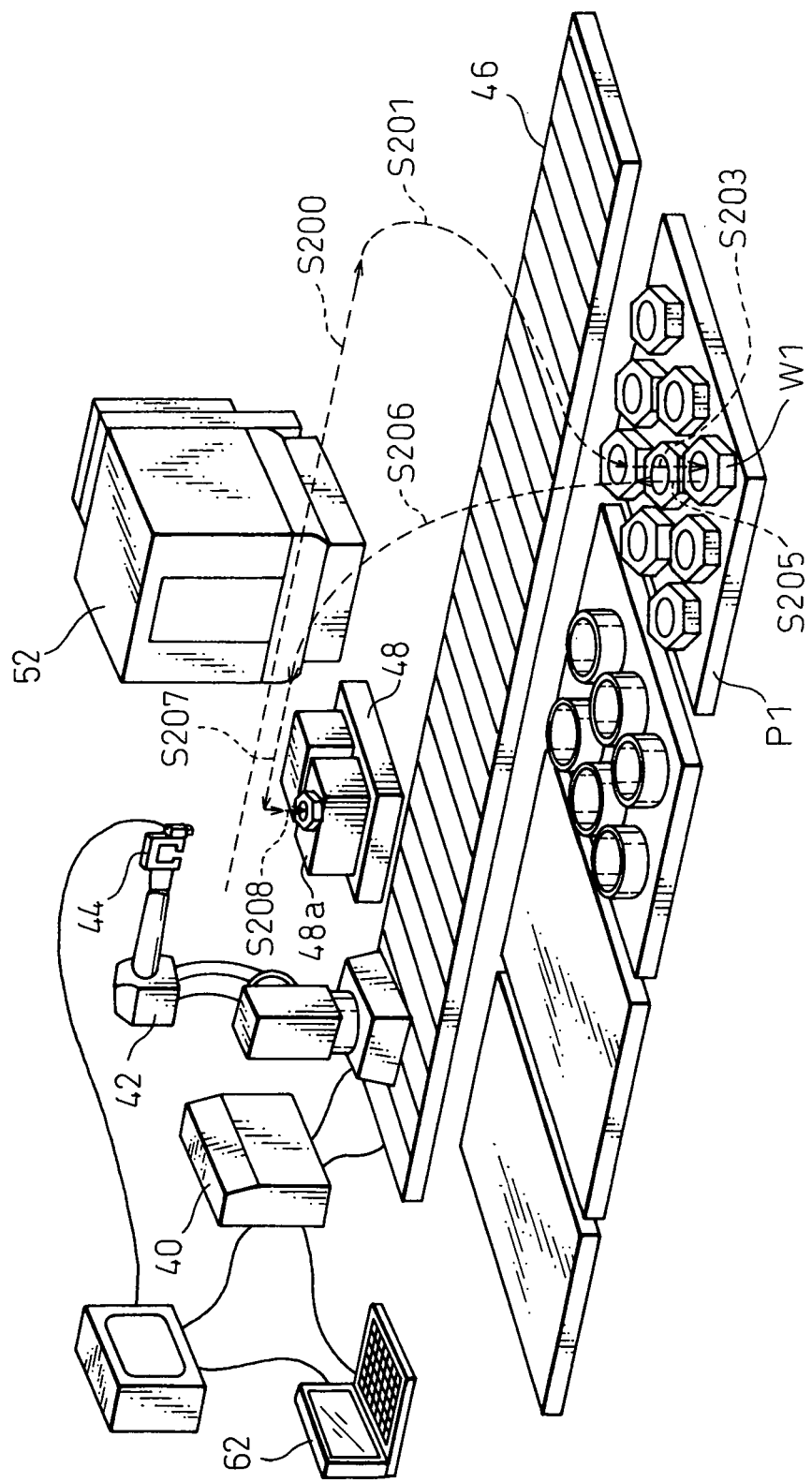
FIGS. 12, 13 and 14 are schematic illustrations showing, by broken-line arrows, a sequence of tasks performed by the robot in the manufacturing system of FIG. 5.
Figure 13:
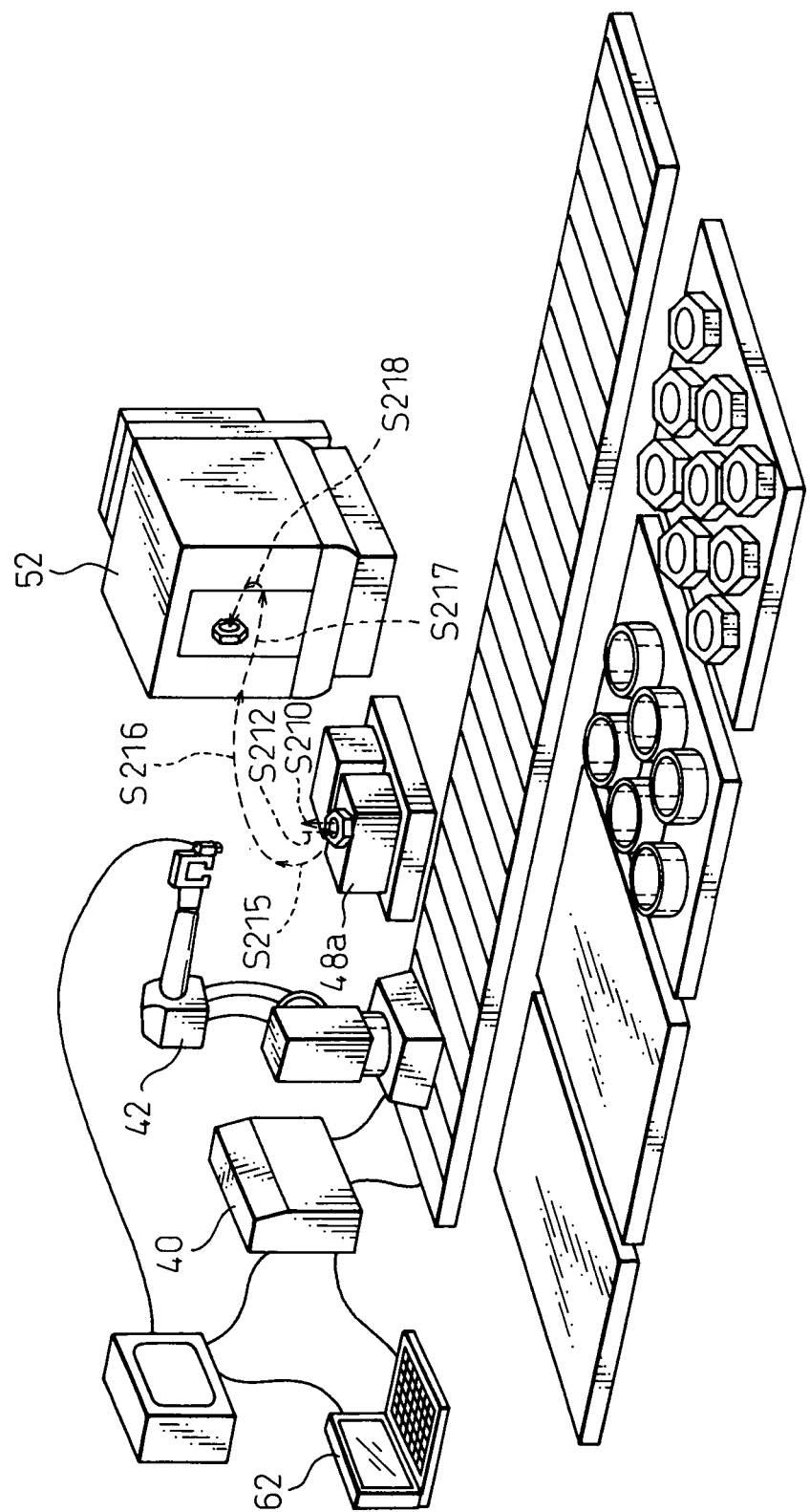
Figure 14:
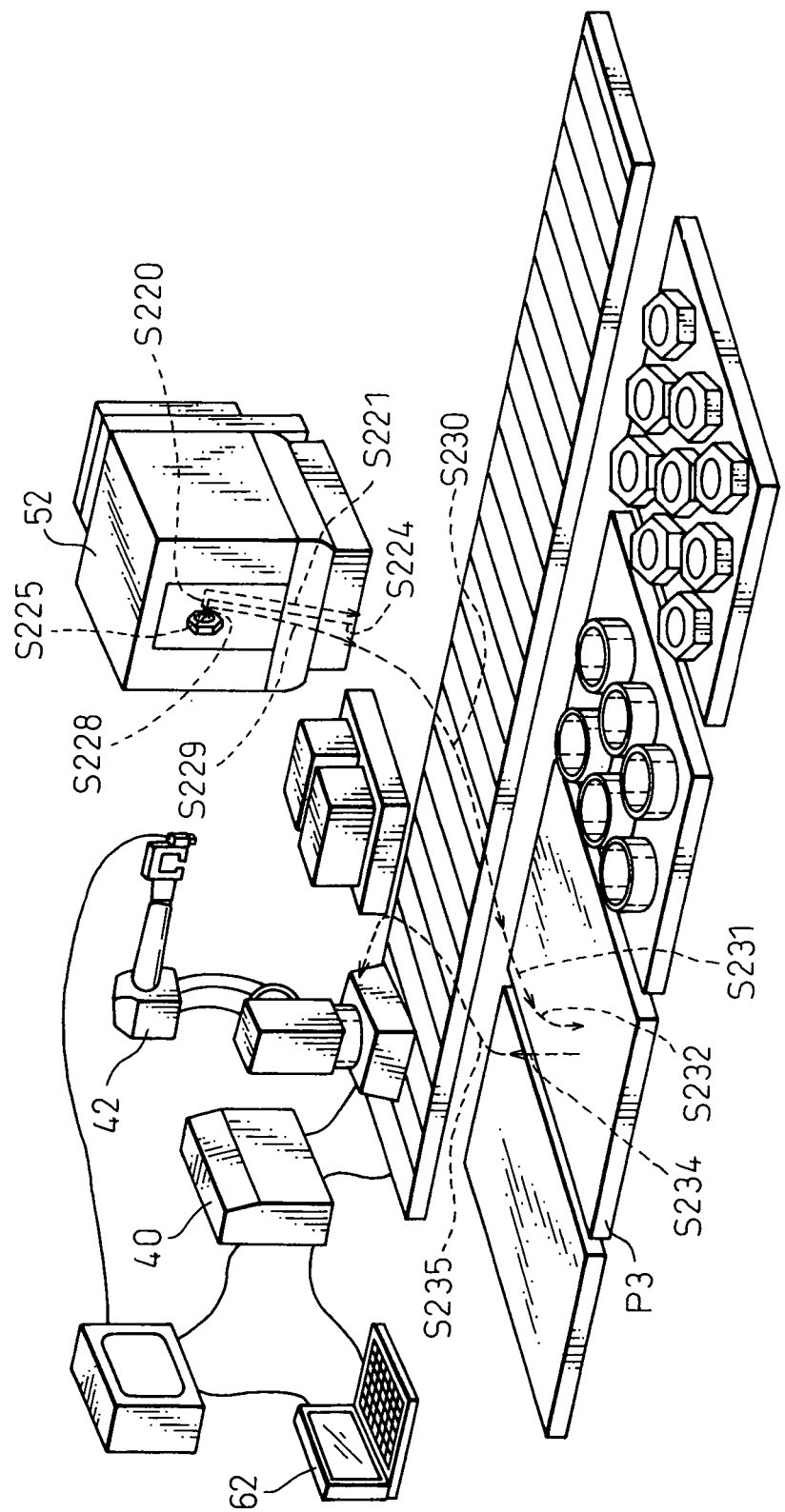

FIGS. 12 to 14 depict operation trajectories of the tool 44, which correspond to the above-described steps S200 to S235, In the illustrated operation trajectories, only the motions relating to steps S203 and S232 are arranged as the workpiece-type depending motion, and the remaining operations depicted by the other operation trajectories do not depend on the types of workpieces. For example, in a case where the workpiece W2 is placed on the pallet P1, a robot task procedure in the first working route Ra substantially corresponds to the above-described procedure, except for the motions relating to steps S203 and S232.

The contents of the operation programs 90, 92 and the operation script 98, for making the robot 42 perform the above-described handling operation, as well as the operation control sequence according to the control program 88, are explained below with reference to FIGS. 15 to 22. In this connection, the CPU 76 of the robot controller 40 has the functions of the information collecting section 18, the program selecting section 20, the processing section 22, the program-completion judging section 24, the stop controlling section 30, the state judging section 32 and the restart controlling section 34 in the robot controller 10 shown in FIGS. 1 to 4.

Figure 15:
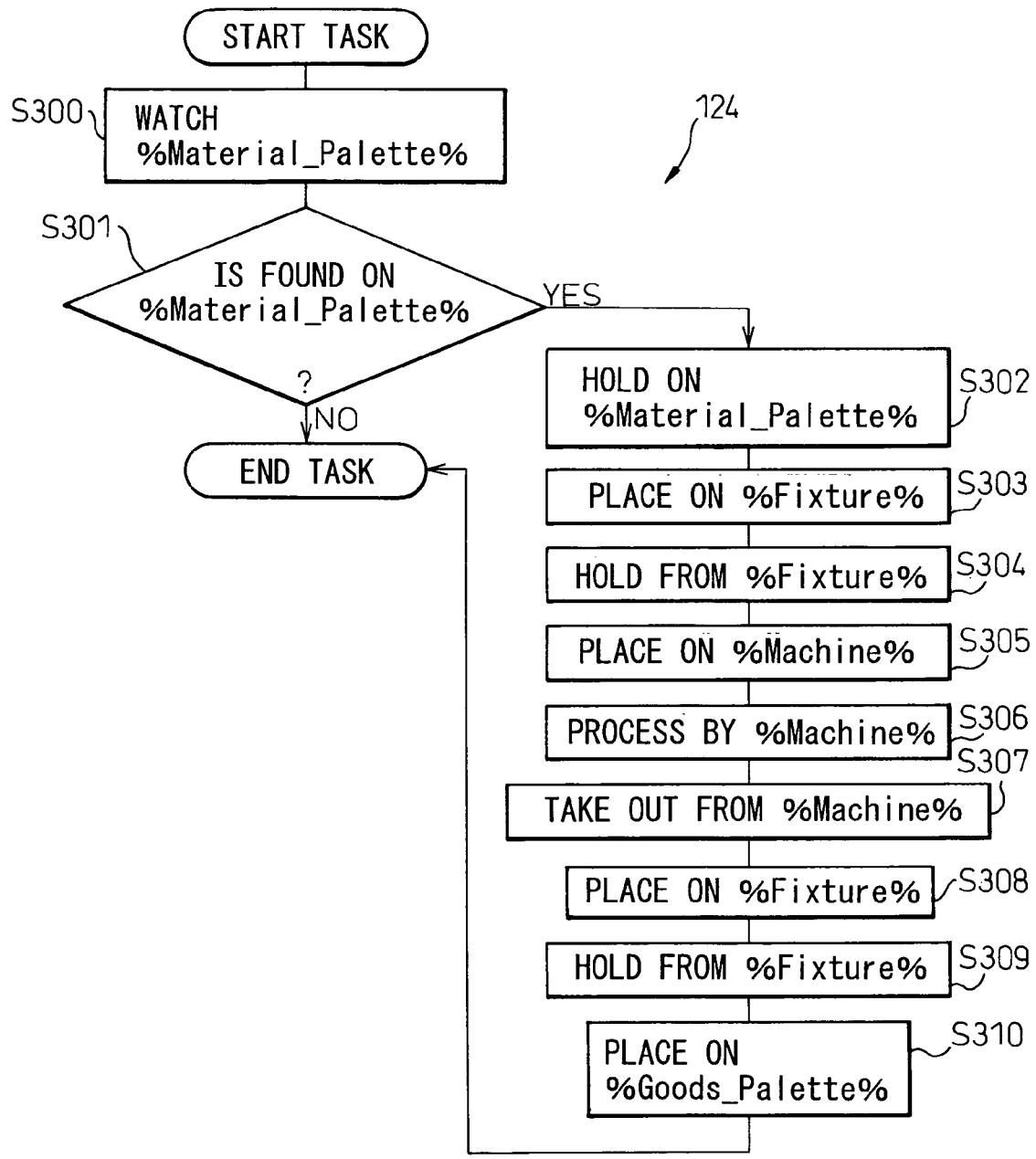
FIG. 15 is an illustration showing operation pattern data used in the manufacturing system of FIG. 5.

FIG. 15 depicts, in a flowchart format, the operation pattern data 124 describing the handling operation performed by the robot 42 from a workpiece's viewpoint. The operation pattern data 124 is prepared to correspond to the contents of the task of the robot 42, and is stored in the hard disc device 116. In the operation pattern data 124, the devices or machines in the manufacturing system, which can be regarded as locations at which individual work units are performed, are described by arguments such as "%Material_Palette%" (a palette for supplying a material), "%Fixture%" (a positioning tool of a provisional table), "%Machine%" (a processing machine) and "%Goods_Palette%" (a palette for storing a finished product). When the names of actual devices or machines are provided for these arguments, an operation script expressing a concrete operation sequence is prepared. For example, the operation script expressing the above handling operation is prepared by providing the individual arguments with names as follows:

%Material_Palette% . . . Palette P1
%Goods_Palette% . . . Palette P3
%Fixture% . . . Positioning tool 48a
%Machine% . . . Processing machine 52

In order to provide the arguments with the concrete names of devices, the device definition data 126 as described below is used. The device definition data 126 is stored in the hard disc device 116. In the data described below, "Palette_P1", "Palette_P3", "Fixture_F1" and "Machine_Left" represent respectively the palette P1, the palette P3, the positioning tool 48a and the processing machine 52 of FIG. 5.

```
<Actions>
    <Action run="W1P1P3MR">
    <ARGUMENTS>
        <OBJECT name="Material_Palette" val="Palette_P1"/>
        <OBJECT name="Goods_Palette" val="Palette_P3"/>
        <OBJECT name="Fixture" val="Fixture_F1"/>
        <OBJECT name="Machine" val="Machine_Left"/>
    </ARGUMENTS>
    </Actions>
```

The hard disc device 116 further stores the device attribute data 128, specifying the names, signal numbers, etc., of the individual devices or machines, which is prepared for each device. In the device attribute data 128, a variety of constants, signal names, waiting times, register numbers, etc., are defined. The device attribute data 128 is also prepared for the processing machine 54, the positioning tools 50a, 50b of the provisional table 50, the palette P2 and the palette P4. In this connection, the same kind of devices, such as the processing machines 52 and 54; the positioning tools 48a, 48b, 50a and 50b; the palettes P1, P2, P3 and P4; have approximately the same data configurations, and the device attribute data of which are usually different only in the values of constants, signal numbers, waiting times and register numbers. Therefore, only the data configuration is first defined by using the device/part class data 130 stored in the hard disc device 116, and thereafter the device attribute data 128 including the other data are prepared.

Figure 16:
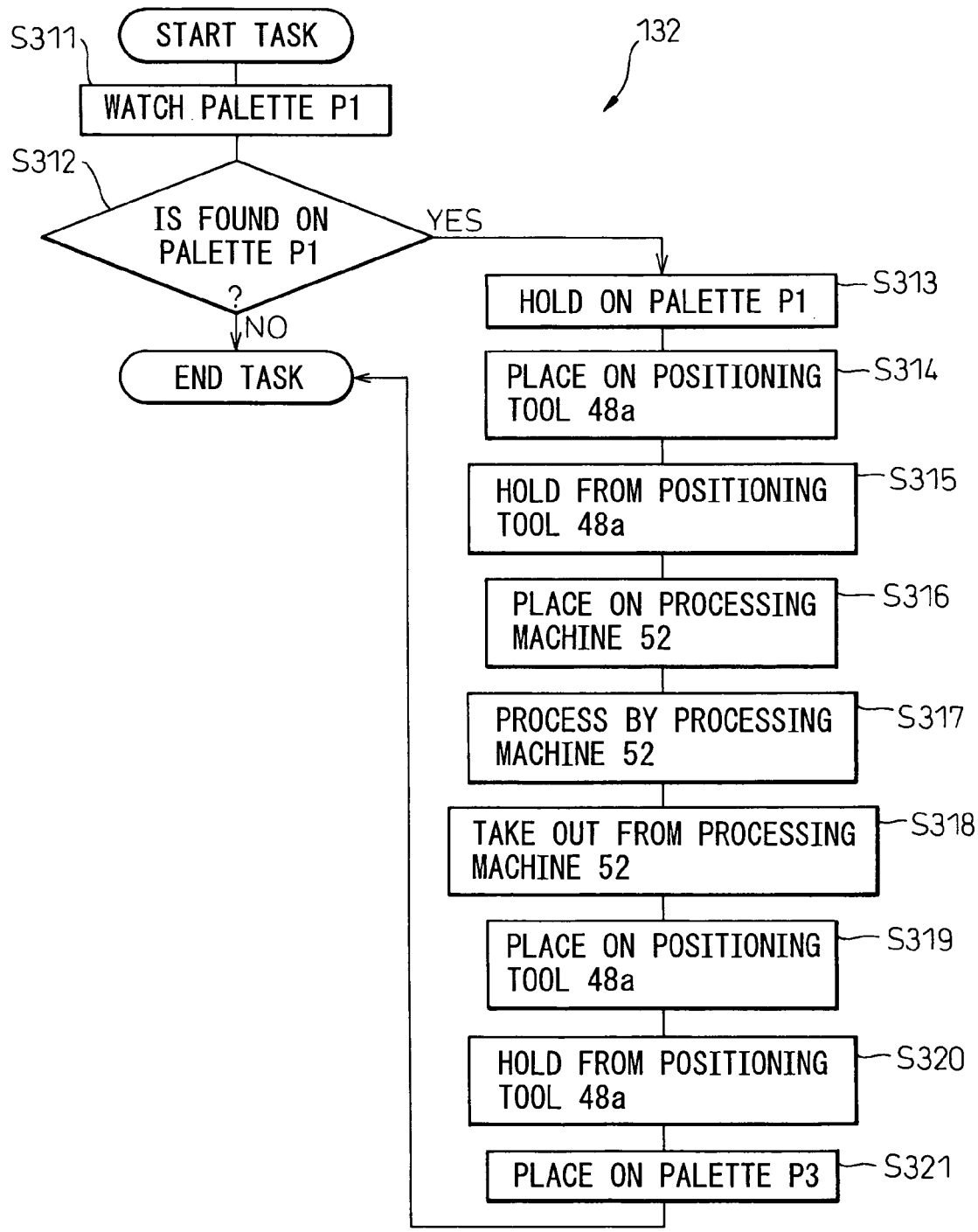
FIG. 16 is an illustration showing a master operation script used in the manufacturing system of FIG. 5.
Figure 17B:
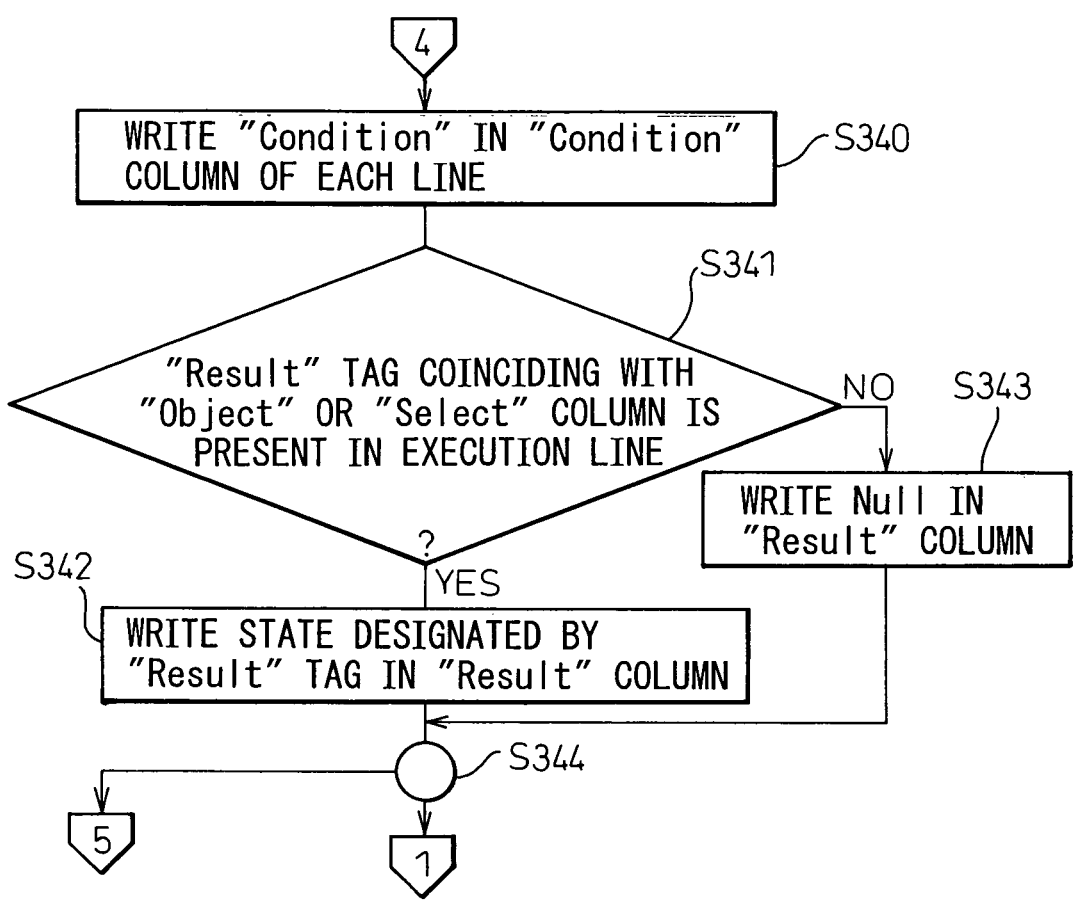
Figure 18A:
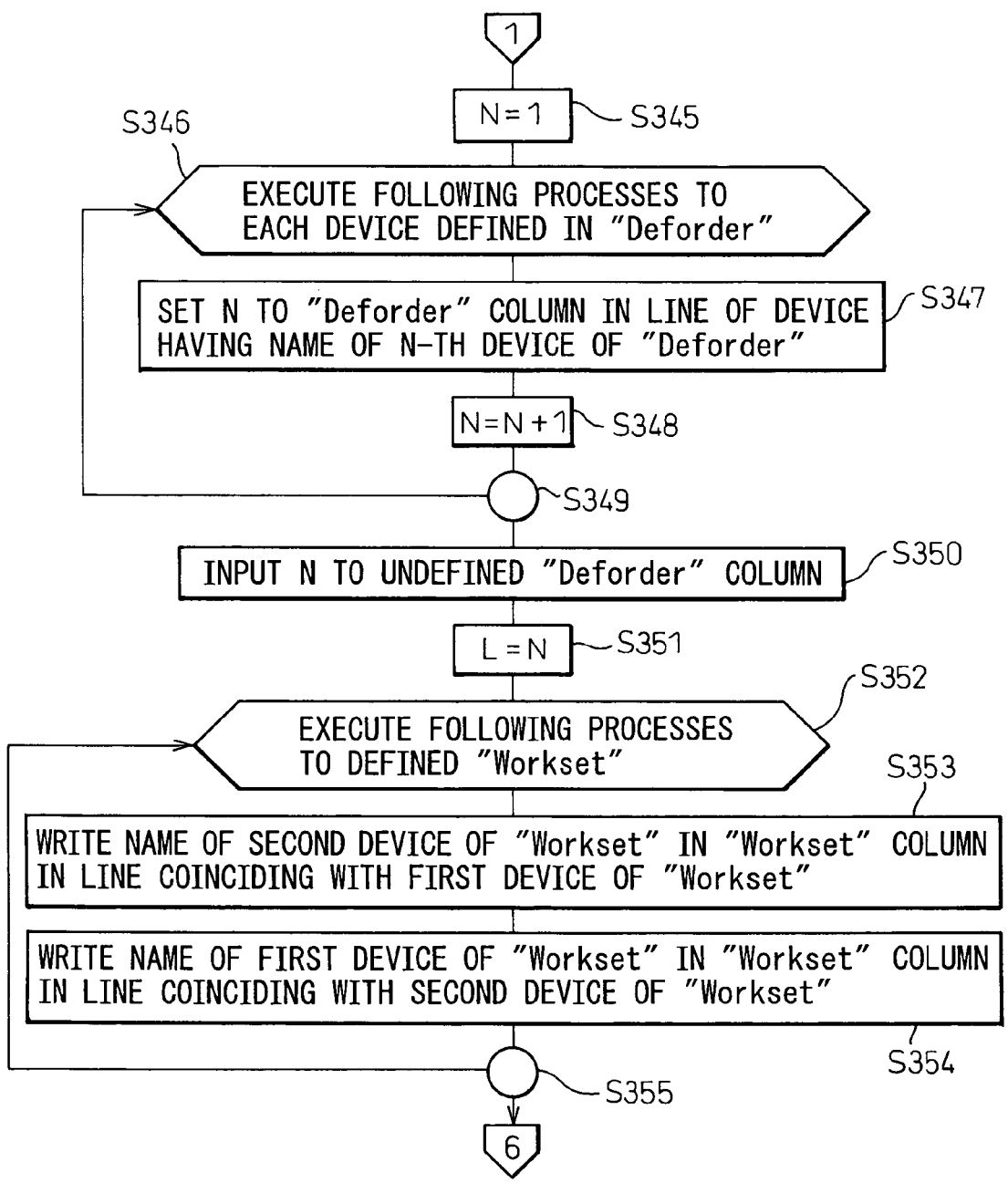
Figure 20A:
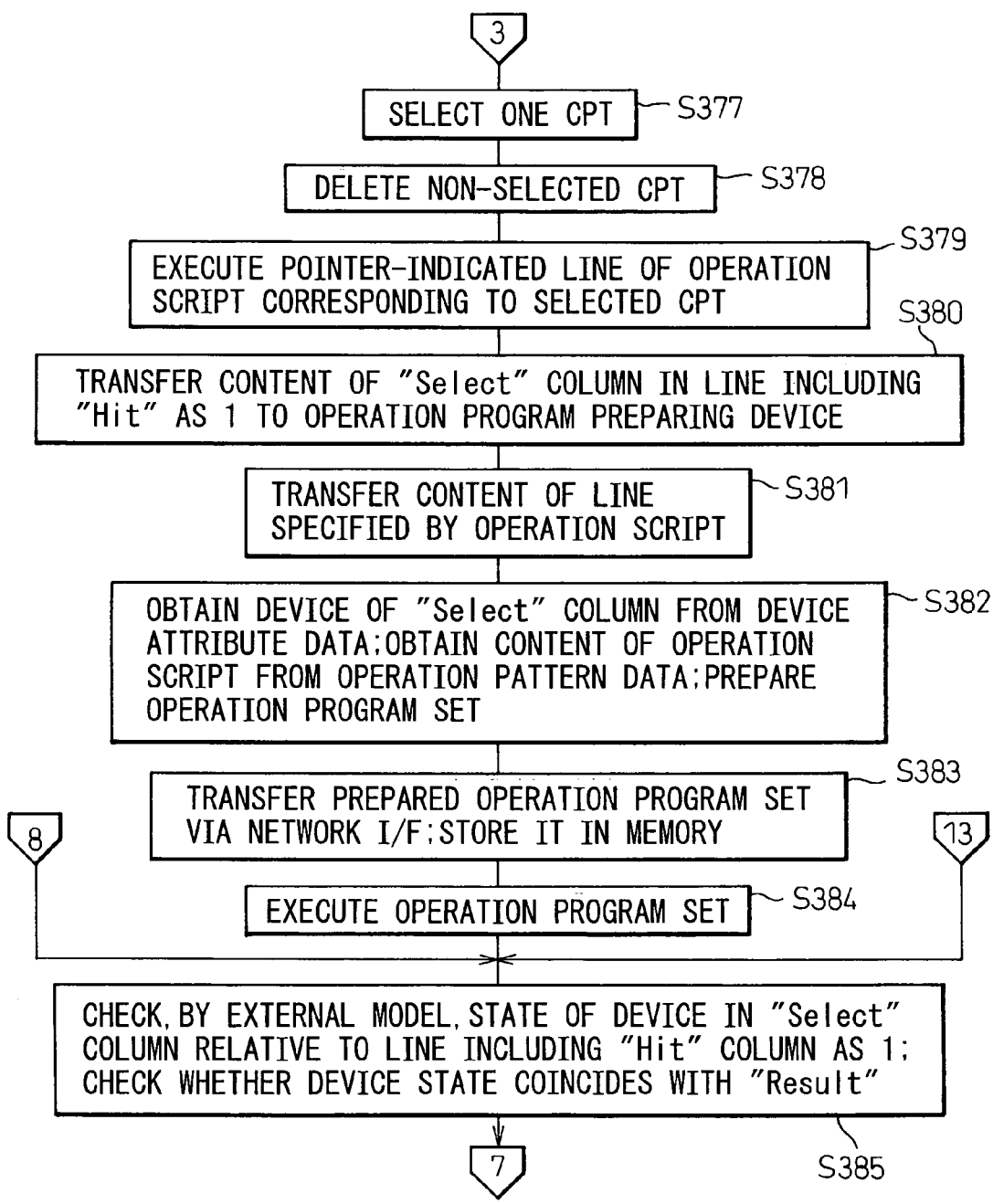
Figure 20B:
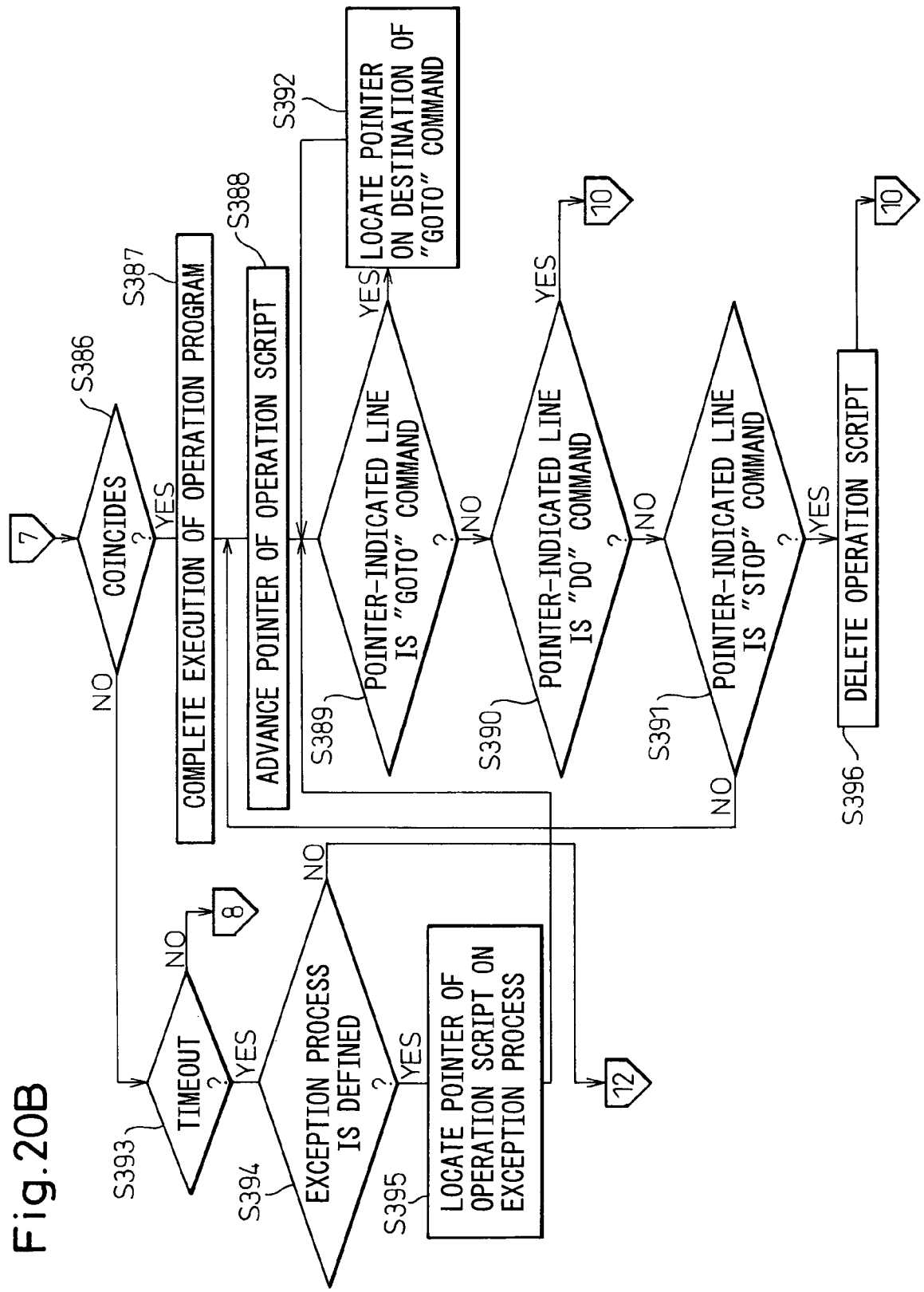

FIG. 16 depicts, in a flowchart format, the master operation script 132 as an operation procedure obtained by applying the device definition data 126 to the operation pattern data 124. When the sets or combinations of operable devices are described in the device definition data 126, it is possible to prepare the master operation script 132 corresponding to all of the device sets. In the manufacturing system shown in FIG. 5, four combinations (corresponding to the operation routes Ra to Rd) of the devices and machines can be considered, and therefore, four master operation scripts 132a, 132b, 132c and 132d are prepared as described below. In this connection, "Fixture_F2" represents the positioning tool 48b, "Fixture_F3" represents the positioning tool 50a, "Fixture_F4" represents the positioning tool 50b, "Palette_P2" represents the palette P2, "Palette_P4" represents the palette P4, and

```
"Machine_Right" represents the processing machine 54.
    <Actions>
        <Action run="F1P1P3ML"> (Master operation script
132a)
            <ARGUMENTS>
                <OBJECT name="Material_Palette"
val="Palette_P1"/>
                <OBJECT name="Goods_Palette"
val="Palette_P3"/>
                <OBJECT name="Fixture" val="Fixture_F1"/>
                <OBJECT name="Machine" val="Machine_Left"/>
            </ARGUMENTS>
        </Action>
        <Action run="F2P2P4ML"> (Master operation script
132b)
            <ARGUMENTS>
                <OBJECT name="Material_Palette"
val="Palette_P2"/>
                <OBJECT name="Goods_Palette"
val="Palette_P4"/>
                <OBJECT name="Fixture" val="Fixture_F2"/>
                <OBJECT name="Machine" val="Machine_Left"/>
            </ARGUMENTS>
        </Action>
        <Action run="F1P1P3MR"> (Master operation script
132c)
            <ARGUMENTS>
                <OBJECT name="Material_Palette"
val="Palette_P1"/>
                <OBJECT name="Goods_Palette"
val="Palette_P3"/>
                <OBJECT name="Fixture" val="Fixture_F3"/>
                <OBJECT name="Machine" val="Machine_Right"/>
            </ARGUMENTS>
        </Action>
        <Action run="F2P2P4MR"> (Master operation script
132d)
```

-continued

```
            <ARGUMENTS>
                <OBJECT name="Material_Palette"
val="Palette_P2"/>
                <OBJECT name="Goods_Palette"
val="Palette_P4"/>
                <OBJECT name="Fixture" val="Fixture_F4"/>
                <OBJECT name="Machine" val="Machine_Right"/>
            </ARGUMENTS>
        </Action>
    </Actions>
```

The master operation scripts 132a, 132b, 132c and 132d, as prepared, are copied from the hard disc device 116 and sent to the memory 78 of the robot controller 40 through the network interface 80, and are stored as the master operation scripts 94a, 94b, 94c and 94d.

The operation program preparing device 62 refers to prescribed forms given as the several combinations of operation blocks (provided by subdividing a work unit) prepared respectively for steps S300 to S310 (FIG. 15) of the operation pattern data 124, and thereby prepares a plurality of (or eleven) operation programs (or the operation program set 134) for respectively instructing the work units at steps S311 to S321 (FIG. 16) of the master operation script 132, by using the device definition data 126 and the device attribute data 128. As for the operation program set 134, four operation program sets 134a, 134b, 134c and 134d are prepared so as to correspond to the above-described four master operation scripts 132a, 132b, 132c and 132d. The operation program sets 134a, 134b, 134c and 134d as prepared are copied from the hard disc device 116 and sent to the memory 78 of the robot controller 40 through the network interface 80, and are stored as the operation program sets 96a, 96b, 96c and 96d.

Upon receiving a manufacturing start command from the cell controller 142, the robot controller 40 checks whether the processing machines 52, 54 are in a state of processing, as well as whether workpieces are set on the positioning tools 48a, 48b, 50a and 50b, through the digital signal input/output circuit 82, and thereafter selects one of the master operation scripts 94a, 94b, 94c, 94d that meets the command. The master operation script as selected is copied, so as to prepare the operation script 98. An operation script 98 is prepared respectively for several workpieces W1, W2, for which a parallel task can be performed on the basis of the manufacturing command from the cell controller 142, and is stored in the memory 78 (the stored scripts are the operation scripts 98$_1$, 98$_2$). In this connection, the cell controller 142 may designate a processing machine or a positioning jig, used for the task, together with the manufacturing command, and in this case, it is not necessary to check the states of the processing machines 52, 54 and the positioning tools 48a, 48b, 50a, 50b.

When the operation script 98 is prepared, the CPU 76 judges, by using the task starting condition 14 (FIG. 1) in each of the operation scripts 98$_1$, 98$_2$, whether any of the operation scripts 98$_1$, 98$_2$ are in an executable state, in accordance with the control program 88. At this time, the CPU 86 detects respectively the states of the processing machines 52, 54 and the positioning tools 48a, 48b, 50a, 50b, through the digital signal input/output circuit 82, and checks whether the respective states satisfy the task starting condition 14 of an operation program ready to be executed (i.e., indicated by a pointer) in each of the operation scripts 98$_1$, 98$_2$. If the several operation scripts satisfy the task starting condition 14, the CPU 76 selects one of these operation scripts in accordance with the specific rule as described. The CPU 76 then processes, for execution, the operation program ready to be executed in the selected operation script in one of the operation program sets 96a, 96b, 96c, 96d, which corresponds to the selected operation program.

In the preparation of the operation program in the above-described order, the operation program preparing device-62 prepares, for the operation pattern data 124, the device definition data 126, the number of which corresponds to the number of all device sets, so as to prepare the master operation scripts 132 corresponding to all device sets, and inputs the device attribute data 128 and the device/part class data 130 to the master operation scripts 132, as prepared, thereby previously preparing all of the operation program sets 134. Alternatively, it is possible for the CPU 76 of the robot controller 40 to determine the devices to be used for the task on the basis of the external model 100, in accordance with the control program 88, and to transmit the information of the devices as determined to the operation program preparing device 62 through the network interface 80, so that the operation program preparing device 62 can prepare the operation program set 134 concerning the set of devices as to be actually used.

After completing the execution of the operation program, the CPU 76 of the robot controller 40 detects the current states of the processing machines 52, 54 and the positioning tools 48a, 48b, 50a, 50b, through the digital signal input/output circuit 82, and judges whether the task completing condition 26 (FIG. 2) of the operation program executed in the operation script is satisfied. When the task completing condition 26 is satisfied within a certain time, the execution of the corresponding line of the operation script is completed and, therefore, the CPU 76 selects the executable operation script 98₁, 98₂ in accordance with the control program 88. The CPU 76 repeats this operation until when all operation programs are completed. The CPU 76 always detects the current states of the processing machines 52, 54 and the positioning tools 48a, 48b, 50a, 50b, through the digital signal input/output circuit 82, in accordance with the control program 88, and updates the external model 100 stored in the memory 78 as occasion demands. Also, when the task completing condition 26 of the operation script is satisfied, the CPU 76 updates the internal model 102 in accordance with the control program 88. Further, the CPU 76 compares the external model 100 with the internal model 102, in accordance with the control program 88, and, if the external model 100 does not coincide with the internal model 102, executes the exception-processing work unit as described.

FIGS. 17A to 21 are flowcharts showing the operation sequence of the control program 88. The control program 88 prepares the condition process table (CPT) 104, shown in FIG. 22, in the memory 78, and uses the CPT 104 as an operation area to progress processes. Individual steps of the operation sequence will be explained below with reference to the drawings.

At step S330, it is declared that the processes up to step S406 are executed repeatedly for all operation scripts 98 stored in the memory 78.

At step S331, the CPT 104 as the operation area is prepared in the memory 78. At the same time, values of all spaces in all lines in the CPT 104 are initialized.

At step S332, a line indicated by a pointer in the operation script during processing is set as a line to be executed.

At step S333, it is declared that the processes up to step S343 are executed repeatedly for individual "Condition" tags <Condition/> described in the execution line.

At step S334, the names (i.e., object names) of devices or machines of the "Condition" tags are taken out, and are written into an "Object" column of the CPT 104.

At step S335, it is judged whether the object names written in the "Object" column are device selectable alternatives. The device selectable alternatives are defined by a "Select" tag <Select/> in the operation script.

When the object names are not judged as the device selectable alternatives at step S335, the object names are written into a "Select" column of the CPT 104, at step S336.

When the object names are judged as the device selectable alternatives at step S335, it is checked, at step S337, whether the device selectable alternative coinciding with the "Select" tag is present.

When the device selectable alternative coinciding with the "Select" tag is not present at step S337, the device selectable alternatives indicated by the "Condition" tag are not correct and thus are invalid, so that the CPT 104 is erased from the memory 78, at step S338, to terminate the processes of this operation script, and then the sequence returns to step S330.

When the device selectable alternative coinciding with the "Select" tag is present at step S337, lines are added to the CPT 104, the number of which corresponds to the number of prospective device selectable alternatives, divided by commas and described after "among" in the "Select" tag, and the device names as the prospective device selectable alternatives are written into the "Select" column of the CPT 104.

At step S340, "Condition" described between a colon after the device name and a comma subsequent thereto in the "Condition" tag is written into the "Condition" column of each line of the CPT 104.

At step S341, it is checked whether a device name identical to the device name written in the "Object" column or the "Select" column is designated by a "Result" tag <Result/> in the execution line of the Operation script.

When a device name identical to the device name written in the "Object" column or the "Select" column is designated by the "Result" tag, "Result Condition" described between a colon after the device name and a comma subsequent thereto in the "Result" tag is written in the "Result" column of the CPT 104, at step S342.

When a device name identical to the device name written in the "Object" column or the "Select" column is not designated by the "Result" tag, NULL (denoted by "−" in FIG. 22) is written in the "Result" column of the CPT 104, at step S343.

At step S344, it is described that the processes from step S333 to step S340 are executed repeatedly for each "Condition" described in the execution line of the operation script.

When the process at step S344 ends and the process sequence reaches step S345, object names indicated in all "Condition"s are written in the "Object" column of the CPT 104. If the object names are the prospective device selectable alternatives, the prospective device selectable alternatives are written in the "Select" column, and the task starting condition 14 of the object is written in the "Condition" column.

From step S345 to step S350, the processes are executed in a device selection order, based on the "Deforder" tag <Deforder/> in the operation script. Only one "Deforder" tag is described in the operation script.

At step S345, a variable N for the operation is initialized to 1.

At step S346, it is declared that the processes of steps S347 and S348 are executed repeatedly relative to a device selection order designating element described between commas in the "Deforder" tag.

At step S347, a device name identical to the N-th device selection order designating element in the "Deforder" tag is searched in the "Object" column of the CPT 104, and N is written in the "Deforder" column in this line.

At step S348, one is added to the variable N.

At step S350, N is written in the "Deforder" column which is not defined yet in the CPT 104.

At step S351, the value of the variable N is stored as variable L, for the sake of subsequent processes.

From step S352 to step S355, a device combination designating element denoted by a "Workset" tag <Workset/> in the operation script is executed.

At step S352, it is declared that the processes from step S353 to step S355 are executed repeatedly for each of several "Workset" tags described in the operation script.

At step S353, a device name as a first parameter of the "Workset" tag is searched in the "Select" column of the CPT 104, and a device name as a second parameter of the "Workset" is written in the "Workset" column of a corresponding line.

At step S354, a device name as a second parameter of the "Workset" tag is searched in the "Select" column of the CPT 104, and a device name as a first parameter of the "Workset" is written in the "Workset" column of a corresponding line.

At step S356, the variable N for the operation is initialized to 1.

At step S357, it is declared that the processes up to step S371 are repeated until the variable N coincides with the variable L.

At step S358, the "Deforder" column showing N is searched in the CPT 104.

At step S359, a state of a device described in the "Select" column in a line found at step S358 is checked by the external model 100.

At step S360, it is judged whether the state of the device in the "Select" column coincides with the external model 100.

When it is judged at step S360 that the state of the device in the "Select" column does not coincide with the external model 100, it is then judged whether the check has been carried out for the entirety of the CPT 104.

When it is judged at step S361 that the check has not been carried out for the entirety of the CPT 104, the "Deforder" column showing N is searched in the next line of the CPT 104, at step S362.

When it is judged at S361 that the check has been carried out for the entirety of the CPT 104, it is determined at step S363 that a device coinciding with the external model 100 is not found and thus the allocation of the device relative to this operation script has failed.

Then, at step S364, the CPT 104 is erased from the memory 78, to terminate the processes of this operation script, and the sequence returns to step S330 for the sake of processing the other operation script.

When it is judged at step S360 that the state of the device in the "Select" column coincides with the external model 100, the sequence proceeds to step 3365 and subsequent steps.

At step S365, it is checked whether a device combination designating element is written in the "Workset" column. When a device combination designating element is not written, it is effected that the allocation of one device has been completed, and, at step S374, a "Hit" column in the N-th line of the CPT 104 is set to 1, and then the sequence proceeds to step S371.

When it is judged at step S365 that the device combination designating element is written in the "Workset" column, a device written in the "Workset" column is searched in the "Select" column of the CPT 104, at step S366, and it is judged whether a device has been found, at step S367.

When it is judged at step S367 that a device has not been found, the sequence proceeds to step S372, and it is regarded that the device allocation has failed. Then, at step S373, the CPT 104 is erased from the memory 78, to terminate the processes of this operation script.

When it is judged at step S367 that a device has been found, the "Condition" column in an M-th line of the CPT 104, in which the device is found, is checked by the external model 100, at step S368. Then, at step S369, it is judged whether the "Condition" column coincides with the external model 100.

When it is judged at step S369 that the "Condition" column does not coincide with the external model 100, the sequence returns to step S366, and a device written in the "Workset" column is searched for in the "Select" column of the CPT 104.

When it is judged at step S369 that the "Condition" column coincides with the external model 100, it is effected that two devices described in the device combination designating element have been allocated at once, so that, at step S370, the "Hit" column in both of the N-th and M-th lines of the CPT 104 are set to 1.

At step S371, one is added to N, and at step S375, the sequence returns to step S357, and then the processes from step S358 to step S371 are repeated until L and N coincide with each other.

When the process sequence reaches step S376, it is effected that the processes for one operation script has been completed. Then the sequence returns to step S330, and the processes from step S330 to step S375 are repeated for all of the operation scripts in the memory 78.

The processes after step S377 are executed after the processes for all operation scripts in the memory 78 have been completed. At this time, CPTs 104 for the operation scripts in which the device allocation has been completed remain in the memory 78.

At step S377, one CPT 104 is selected from among the CPTs 104 remaining in the memory 78. The unselected CPTs 104 are deleted from the memory 78, at step S378, and only one CPT 104 remains in the memory 78.

By the processes up to step S379, it is determined that a line indicated by the pointer in the operation script corresponding to the CPT 104 remaining in the memory 78 is executed.

At step S380, the contents of the "Select" column in the lines, the "Hit" column of which shows 1, are transferred to the operation program preparing device 62.

At step S381, the contents of the line specified by the operation script is transferred to the operation program preparing device 62.

The processes at step S382 and step S383 are not in the processing sequence in the control program 88, but are the processes in the operation program preparing device 62. However, the processes are performed synchronously with the processing sequence of the control program 88, and thus are expressed as one processing sequence.

At step S382, the devices described in the "Select" column are searched for in the device attribute data 128, the contents of the operation script are searched for in the operation pattern data 124, and the device definition data 126 is prepared from the contents described in the "Select" column transferred at step S380. Then, the device definition data 126 is input to the operation pattern data 124, to prepare the master operation script 132, and the device attributed data 128 is input to the master operation script 132, to prepare the operation program set 134.

At step S383, the operation program set as prepared is transferred through the network, and is stored in the memory 78.

At step S384, the operation program stored in the memory 78 is executed.

At step S385, the states of devices written in the "Select" column in the lines, in which the "Hit" column of the CPT 104 shows 1, are checked by the external model 100, so as to check whether the states of devices coincide with the "Conditions" written in the "Result" column.

At step S386, it is judged whether the states of the devices in the lines, in which "Hit" column shows 1, coincide with the external model 100. When it is judged that the states of devices in all lines, in which the "Hit" column of the CPT 104 shows 1, coincide with the external model 100, the sequence shifts to step S387, and if not, the sequence shifts to step S393.

When the sequence reaches step S387, it is effected that the execution of one line indicated by the pointer in the operation script has been completed.

At step S388, the pointer of the operation script is shifted to the next line.

At step S389, it is judged whether a command in the line indicated by the pointer in the operation script is a "GOTO" command. When the command in the indicated line is the "GOTO" command, a destination indicated by the "GOTO" command is searched for in the operation script, and the pointer is located on the destination, at step S392. When the command in the indicated line is not the "GOTO" command, the sequence shifts to step S390.

At step S390, it is judged whether a command in the line indicated by the pointer in the operation script is a "DO" command. When the command in the indicated line is the "DO" command, the sequence returns to step S330, and the processes for all operation scripts in the memory 78 are executed again. When the command in the indicated line is not the "DO" command, the sequence shifts to step S391.

At step S391, it is judged whether a command in the line indicated by the pointer in the operation script is a "STOP" command. When the command in the indicated line is the "STOP" command, it is regarded that the processes of the operation script have been completed, and the operation script is deleted from the memory 78, at step S396. When the command in the indicated line is not the "STOP" command, it is judged that the command is not executable, and the sequence returns to step S388 to disregard this command, and the pointer is advanced.

When it is judged at step S386 that the states of the devices do not coincide with the external model 100, it is checked at step S393 whether a timeout has occurred. If the timeout has not occurred, the sequence returns to step S385, and the check is repeated.

When it is judged at step S393 that a timeout has occurred, then it is judged at step S394 whether an exception process <Exception Goto/> is defined in the line currently being executed.

When the exception process is defined, a destination indicated by the exception process is searched for in the operation script, and the pointer is located on the destination at step S395, and the sequence shifts to step S389.

When the exception process is not defined, the sequence shifts to alarm-stop and restart-processing steps, i.e., step S397 and steps subsequent thereto.

At step S397, the robot 42 is set to an alarm state, and stopped as an emergency.

At step S398, the name of the operation program, the name of the operation script, the contents of the execution line of the operation script, and the inconsistency between the "Select" column of the CPT 104 and the external model 100, at an instant the robot stops, are displayed, and details of the alarm are notified to the operator.

At step S399, a start command from the operator using the input unit 84b of the teaching operation panel 84 is awaited.

At step S400, it is checked whether the external model 100 and the internal model 102 coincide entirely with each other. When an entire coincidence is confirmed at step S400, the sequence shifts to step S406 to cancel the alarm from the robot, and the operation program is executed from the suspended step, so as to restart the task.

When an entire coincidence is not confirmed at step S400, a difference between the external model 100 and the internal model 102 is displayed in the display unit 84a of the teaching operation panel 84, at step S401, so as to permit an operator to comprehend the details of inconsistency between these models.

At step S402, a proper message of a cause and measure, in connection with the inconsistency between the external model 100 and the internal model 102, is displayed in the display unit 84a.

At step S403, an enquiry message and a selection menu, to be presented to the operator, about whether the task is to be restarted by disregarding the inconsistency between the external model 100 and the internal model 102, are displayed in the display unit 89a.

At step S404, it is judged whether the operator has selected the restarting of the task by disregarding the inconsistency, in response to the message displayed at step S403, and, when the operator has selected the restarting, all contents of the external model 100 are copied to be provided to the internal model 102, and the internal model 102 is forcibly made coincident with the external model 100 at step S405. Then, at step S406, the alarm from the robot 42 is canceled, and the operation program is restarted from the suspended step.

When it is judged at step S404 that the operator has not selected the restarting, the sequence returns to step S399, and the operator's input of a start command is awaited.

The control operation sequence of the control program 88 has been explained above.

The present invention is not limited to the above embodiments, and various modifications can be made within the range of the descriptions of claims. For example, in place of the configuration wherein the state of the environment allowing the robot to execute the tasks is obtained from the sensor, another configuration may be adopted, wherein an artificial working environment is prepared by a simulation software, and this artificial state is altered at random or in accordance with a certain rule, so as to check the operating state of the robot. Also, it is possible to previously check the operation state of the robot in an offline manner, by simulating the work units executed by the robot, means for selecting the subsequently executed work unit, and the states of the working environment, in an offline programming device using simulation software.

While the invention has been described with reference to specific preferred embodiments, it will be understood, by those skilled in the art, that various changes and modifications may be made thereto without departing from the scope of the following claims.

The invention claimed is:

1. A device for controlling a robot;
the device making the robot execute tasks including a plurality of work units in a parallel manner for several workpieces, in accordance with a plurality of operation programs for individually commanding the plurality of work units;
each of the plurality of operation programs including a description of a task starting condition as a precondition for starting a corresponding work unit by the robot;
the device comprising:
an information collecting section collecting state information showing, in real time, an operating state of an environment allowing the robot to execute said tasks;
a program selecting section selecting a first executable program satisfying said task starting condition described in said first executable program, from operation programs ready to be executed for workpieces among said plurality of operation programs, by judging whether said operating state satisfies said task starting condition based on said state information collected by said information collecting section;
a processing section processing, for execution, said first executable program selected by said program selecting section; and
a program-completion judging section judging whether said processing section has completed or not a processing of said first executable program;
wherein said program selecting section selects a second executable program satisfying said task starting condition described in said second executable program, from said operation programs ready to be executed, by judging whether said operating state satisfies said task starting condition based on said state information, as an operation program to be subsequently processed for execution by said processing section, depending on a judgment performed by said program-completion judging section;
wherein said program-completion judging section is provided with internal information showing a state of an internal model provided by modeling said environment allowing the robot to execute said tasks, said internal information adapted to show an operating state of said environment based on whether or not a command in an operation program is output, and judges whether said internal information coincides with said state information collected by said information collecting section, thereby judging whether said processing section has completed said processing;
wherein said program-completion judging section judges whether a predetermined time has elapsed during judging whether said processing section has completed or not said processing, said predetermined time being defined from an instant when said command in said operation program is output to an instant when said operating state of said environment is actually changed;
wherein said plurality of operation programs include an exception operation program for commanding an exception-processing work unit provided for an escape motion, said exception operation program being different from said operation programs ready to be executed, wherein a certain operation program in said plurality of operation programs is provided with a branch command for branching to said exception operation program when an abnormality occurs in a work unit commanded by said certain operation program;
wherein, when said program-completion judging section judges that said internal information coincides with said state information and said processing section has completed said processing, and when said program-completion judging section judges that said time has not elapsed during judging whether said processing section has completed or not said processing, said processing section processes said second executable program selected by said program selecting section; and
wherein, when said program-completion judging section judges that said internal information does not coincide with said state information and said processing section has not completed said processing, or alternatively, when said program-completion judging section judges that said time has elapsed during judging whether said processing section has completed or not said processing, and if said branch command is described in said first executable program, said processing section processes said exception operation program in place of said second executable program in accordance with said branch command.

2. A device as set forth in claim 1, wherein said program selecting section specifies a certain number of operation programs ready to be executed for workpieces among said plurality of operation programs, by judging whether said operating state satisfies said task starting condition based on said state information, and selects one first executable program from among said operation programs as specified, in accordance with a predetermined rule.

3. A device as set forth in claim 1, wherein said program selecting section specifies said operation programs ready to be executed, by referring to a plurality of operation scripts defining an execution order of said plurality of operation programs in connection respectively with said workpieces.

4. A device as set forth in claim 3, further comprising a storage section storing said plurality of operation programs and said plurality of operation scripts.

5. A device as set forth in claim 1, wherein, before said program-completion judging section judges that said processing section has completed said processing, said program selecting section selects said second executable program and said processing section processes, for execution, said second executable program.

6. A device as set forth in claim 1, further comprising a stop controlling section making the robot stop as an emergency during execution of said tasks; a state judging section provided with said internal information and judging whether said internal information coincides with said state information collected by said information collecting section; and a restart controlling section canceling an emergency stop and restarting said tasks, when said state judging section judges that said internal information coincides with said state information.

7. A device as set forth in claim 6, wherein, when said state judging section judges that said internal information does not coincide with said state information, said restart controlling section outputs a message signal for notifying at least one of a detail of, and a countermeasure for, non-coincidence between said internal information and said state information, before restarting said tasks.

8. A device as set forth in claim 6, wherein, when said state judging section judges that said internal information does not coincide with said state information, said restart controlling section outputs a message signal for requiring a restart permission instruction, before restarting said tasks.

9. A device as set forth in claim 8, wherein, when said restart permission instruction is entered, said restart controlling section rewrites a content of said internal information so as to coincide with said state information, and thereafter restarts said tasks.

10. A method for controlling a robot;
the method making the robot execute tasks including a plurality of work units in a parallel manner for several workpieces, in accordance with a plurality of operation programs for individually commanding the plurality of work units;
each of the plurality of operation programs including a description of a task starting condition as a precondition for starting a corresponding work unit by the robot;
the method comprising:
collecting state information showing, in real time, an operating state of an environment allowing the robot to execute said tasks;
selecting a first executable program satisfying said task starting condition described in said first executable program, from operation programs ready to be executed for workpieces among said plurality of operation programs, by judging whether said operating state satisfies said task starting condition based on said state information as collected;
processing, for execution, said first executable program as selected;
selecting a second executable program satisfying said task starting condition described in said second executable program, from said operation programs ready to be executed, by judging whether said operating state satisfies said task starting condition based on said state information as collected, depending on a state of processing of said first executable program; and
processing, for execution, said second executable program as selected,
wherein the method further comprises, before selecting said second executable program, judging whether internal information showing a state of an internal model, provided by modeling said environment allowing the robot to execute said tasks, coincides with said state information as collected, said internal information adapted to show an operating state of said environment based on whether or not a command in an operation program is output, thereby judging whether said processing of said first executable program has been completed, and judging whether a predetermined time has elapsed during judging whether said processing of said first executable program has been completed or not said predetermined time being defined from an instant when said command in said operation program is output to an instant when said operating state of said environment is actually changed;
wherein said plurality of operation programs include an exception operation program for commanding an exception-processing work unit provided for an escape motion, said exception operation program being different from said operation programs ready to be executed, wherein a certain operation program in said plurality of operation programs is provided with a branch command for branching to said exception operation program when an abnormality occurs in a work unit commanded by said certain operation program;
wherein, when judging that said internal information coincides with said state information and said processing of said first executable program has been completed, and when judging that said time has not elapsed during judging whether said processing of said first executable program has been completed or not, said second executable program is processed; and
wherein, when judging that said internal information does not coincide with said state information and said processing of said first executable program has not been completed, or alternatively, when judging that said time has elapsed during judging whether said processing of said first executable program has been completed or not, and if said branch command is described in said first executable program, said exception operation program is processed in place of said second executable program in accordance with said branch command.

11. A method as set forth in claim 10, further comprising judging whether said internal information coincides with said state information as collected, when the robot stops due to an emergency during execution of said tasks; and canceling an emergency stop and restarting said tasks, when said internal information is judged as to coincide with said state information.

* * * * *